United States Patent [19]
Namiki et al.

[11] Patent Number: 5,381,238
[45] Date of Patent: Jan. 10, 1995

[54] HELICAL SCAN TYPE PLAYBACK APPARATUS FOR VIDEO DATA RECORDED ON MAGNETIC TAPE

[75] Inventors: Yasuomi Namiki; Masaru Tanaka; Yoshio Tokuyama, all of Yokohama, Japan

[73] Assignee: Victor Company of Japan, Ltd., Yokohama, Japan

[21] Appl. No.: 31,894

[22] Filed: Mar. 16, 1993

Related U.S. Application Data

[62] Division of Ser. No. 515,395, Apr. 27, 1990, Pat. No. 5,223,941.

[30] Foreign Application Priority Data

Apr. 28, 1989 [JP] Japan .................. 1-111074
Jan. 17, 1990 [JP] Japan .................. 2-9127
Jan. 17, 1990 [JP] Japan .................. 2-9128

[51] Int. Cl.⁶ ............................................. H04N 9/89
[52] U.S. Cl. ............................ 358/320; 358/310; 358/328
[58] Field of Search ............... 358/310, 318, 319, 323, 358/328, 329, 320, 321, 330, 36, 37; H04N 9/79, 9/80, 9/89, 9/64

[56] References Cited

U.S. PATENT DOCUMENTS

| | | | |
|---|---|---|---|
| 4,178,606 | 12/1979 | Hirota | 358/328 |
| 4,631,600 | 12/1986 | Fukui | 358/320 |
| 4,685,006 | 8/1987 | Sato . | |
| 4,733,312 | 3/1988 | Morimoto | 358/336 |
| 5,142,377 | 8/1992 | Moriyama et al. | 358/320 |
| 5,223,941 | 6/1993 | Namiki et al. | 358/328 |

FOREIGN PATENT DOCUMENTS

| | | |
|---|---|---|
| 0262320 | 7/1987 | European Pat. Off. . |
| 3306791 | 8/1984 | Germany . |
| 3710740 | 10/1987 | Germany . |
| 3739283 | 6/1989 | Germany . |

Primary Examiner—Tommy P. Chin
Assistant Examiner—Thai Tran
Attorney, Agent, or Firm—Jacobson, Price, Holman & Stern

[57] ABSTRACT

A helical scan type playback apparatus comprising a plurality of magnetic heads, a position signal generation element for generating a signal indicative of each position of these magnetic heads, and a switching element for video signals played back by the plurality of magnetic heads in response to the position signal from the generation element, particularly a playback apparatus for information recorded on a video tape in which the phase of a low frequency band color signal is altered every track of a video tape on the basis of a predetermined rule, thereby allowing spectra of color signals not to overlap with each other between adjacent tracks. This playback apparatus comprises an element for storing the position signal after a first predetermined time has passed from the time when a vertical synchronizing signal of the video signal is received, and a readout element for reading out the position signal stored in the storage element after a second predetermined time has passed from the time when the vertical synchronizing signal is received, and outputting it.

4 Claims, 21 Drawing Sheets

| | FIRST TRACK | SECOND TRACK |
|---|---|---|
| S11 | REC. COLOR PHASE | ↑ ↑ ↑ ↑ ↑ ↑ ≋ | ↑ ↑ ↑ ↑ ↑ ↑ ≋ |
| S12 | REC. COLOR PHASE PROCESSING OUTPUT | ↑ ↑ — — ↑ ↑ ≋ | ↑ ↑ — — ↑ ↑ ≋ |
| S13 | PB COLOR SIGNAL MAIN SIGNAL / CROSSTALK | ↑ ↑ — — ↑ ↑ ≋≋ | ↑ ↑ — — ↑ ↑ ≋≋ |
| S14 | PB COLOR PHASE PROCESSING OUTPUT MAIN / CROSSTALK | ↑ ↑ ↑ ↑ ↑ ↑ ≋≋ | ↑ ↑ ↑ ↑ ↑ ↑ ≋≋ |
| S15 | 1H DELAY CIRCUIT OUTPUT MAIN / CROSSTALK | ↑ ↑ ↑ ↑ ↑ ↑ ≋≋ | ↑ ↑ ↑ ↑ ↑ ↑ ≋≋ |
| S16 | COMB FILTER OUTPUT MAIN / CROSSTALK | ↑ ↑ ↑ ↑ ↑ ↑ ≋ · | ↑ ↑ ↑ ↑ ↑ ↑ ≋ · |

FIG. IC PRIOR ART

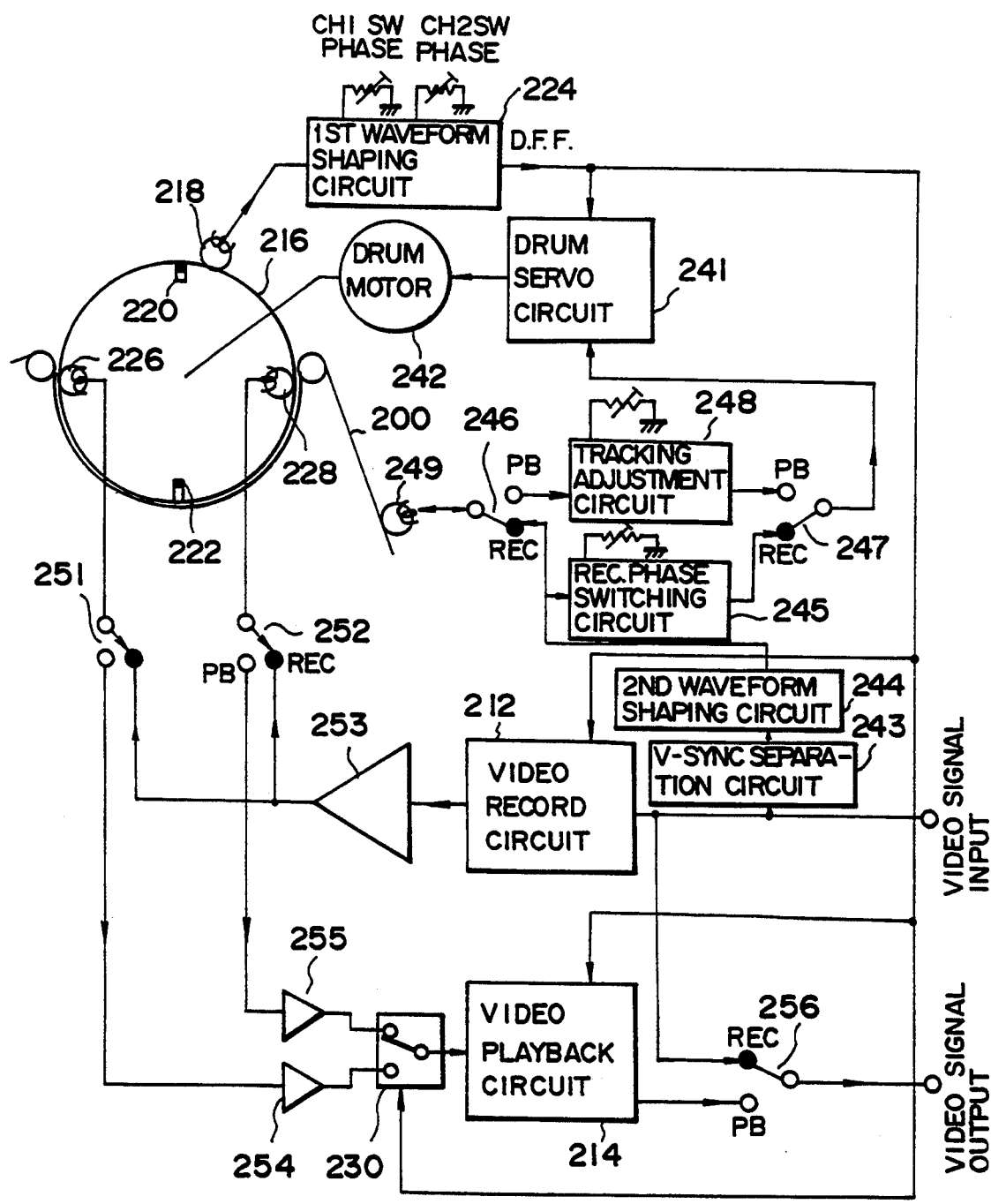
FIG. ID PRIOR ART

| TITLE | "INVERSION ON THE SPOT" SYSTEM | "RESET INVERSION" SYSTEM |
|---|---|---|
| SYSTEM | INVERT ROTATION FROM FINAL PHASE<br><br>DIRECTION OF 90 DEGREES PHASE<br>SWITCHING POINT OF ROTATION (SWITCHING OF COLOR PHASE PROCESSING CONTROL) | RESET PHASE EXISTS ONCE RESET CURRENT PHASE TO RESET PHASE TO INVERT ROTATION<br><br>RESET PHASE<br>SWITCHING POINT OF ROTATION |

FIG. 2A PRIOR ART

HELICAL SCAN TYPE PLAYBACK APPARATUS FOR VIDEO DATA RECORDED ON MAGNETIC TAPE

This is a divisional of application Ser. No. 07/515,395 filed Apr. 27, 1990, now U.S. Pat. No. 5,223,941.

BACKGROUND OF THE INVENTION

This invention relates to a helical scan type video data playback apparatus, and more particularly to a video data playback apparatus capable of satisfactorily playing back or reproducing video data recorded on a magnetic tape by the low frequency band color recording system.

In a conventional helical scan type magnetic playback apparatus including a plurality of magnetic heads arranged on a rotary drum, an approach is employed to alternately switch every field playback video signals from the plurality of magnetic heads, e.g., two magnetic heads in dependency upon a rotational position of the rotary drum to play back a switched video signal. Such a switching is called a "head switching". Playback based on this switching is conducted to play back video signals from two successive tracks in a manner that they overlap with each other by winding a video tape onto the rotary drum over an angular range of 180-odd degrees to switch them in synchronism with the detection of a rotational position of the rotary drum. This switching is conducted at the time of playing back the lower part of a frame so that noises on a picture due to the switching become inconspicuous.

However, because a tension of a video tape at the time of recording and that at the time of playback are different from each other, or for other reasons, the following problems exist: One is skew on a playback frame, i.e., shift of a horizontal position of an image of an object played back or reproduced on a frame from the point where head switching is conducted (switching point); the other is shift of the switching point in dependency upon a tracking adjustment when that adjustments is conducted. Further problem is as follows. Since televisions manufactured, etc. are subjected to various adjustments so that a viewer can observe the lower part of a picture as a result of an improvement in recent televisions and video monitors, noises on a picture due to the above-mentioned switching become conspicuous. For example, the switching point is ordinarily set at 6.5 H (horizontal scanning interval) before the vertical synchronizing signal. However, there are instances where the switching point is shifted therefrom about ±3 H. Since the switching position appears within a frame at 8 to 4.5 H immediately before vertical synchronization, the place where head switching is conducted would enter that frame.

Additional problem is as follows. At the time of playing back a video tape recorded by other VTRs, the switching point might shift depending upon at which position in a width direction of the tape a video signal is recorded, resulting in that the switching point enters further inside of the frame.

First Prior Art

The detail of a conventional one of such helical scan type video data playback apparatus will be described with reference to FIGS. 1A to 1E.

Generally, in helical scan video tape recorders of the low frequency band color recording system, phases of low frequency band color signals (hereinafter simply referred to as a color phase) are altered every track of the video tape on the basis of a predetermined rule to thereby allow spectra of color signals not to overlap with each other between adjacent tracks, thus to eliminate crosstalk interference.

As example of a rule for altering a low frequency band color phase is shown in FIG. 1A. In the first and second tracks arranged one after the other, right-handed rotation to make a phase-shift clockwise (i.e., delayed) by an angle of 90 degrees every 1 H (horizontal scanning interval) and a left-handed rotation to make a phase-shift anticlockwise (i.e., advanced) by an angle of 90 degrees every 1 H are conducted at the time of recording. Namely, phase-shift is made by the right-handed rotation in the case of the first track, and phase-shift is made by the left-handed rotation in the case of the second track as indicated by vectors shown with respect to the phase of an original color signal. As a result, respective signals on adjacent two tracks are shifted in opposite direction by a phase angle of 360 degrees for 4 H (horizontal scanning intervals). Thus, a spectrum having peaks every interval of the horizontal synchronizing frequency $f_H$ is shifted by $f_H/4$ in an opposite direction every track, resulting in the fact that spectra do not overlap with each other between adjacent tracks.

FIG. 1B shows an example of the configuration of a conventional apparatus for conducting recording/playback in accordance with such a rule. On the recording and reproducing sides of the apparatus, a recording color phase processing circuit 202 and a playback color phase processing circuit 204 are provided, respectively. As shown in FIG. 1C, the recording color phase processing circuit 202 and the playback color phase processing circuit 204 carry out exactly opposite processing to return the color phase to an original one. Further, as shown in FIGS. 1B and 1C, an adder circuit 208 adds an output from the playback color phase processing circuit 204 and an output from a 1 H delay circuit 206 for delaying this output by 1 H to cancel a crosstalk.

Namely, the recording color phase processing circuit 202 implements rotation to a phase of a low frequency band color signal $S_{11}$ every 90 degrees to provide a color phase signal $S_{12}$ to store it onto a magnetic tape 200. The direction of this rotation is switched at a predetermined timing every field in correspondence with a recording color phase processing control signal.

A color phase signal $S_{13}$ reproduced from the magnetic tape 200 is changed back to an original color phase signal $S_{14}$ in correspondence with a playback color phase processing control signal at the playback color phase processing circuit 204.

The color phase signal $S_{14}$ is added, at an adder 208, to a color phase signal $S_{15}$ delayed by 1 H by a 1 H delay circuit 206, resulting in a color phase $S_{16}$.

FIG. 1D shows the configuration of an example of a conventional video tape recorder for controlling switching between the right rotation and the left rotation of the recording and playback color phase processing circuits 202 and 204 of FIG. 1B.

The video recording circuit 212 includes a recording color phase processing circuit 202 of FIG. 1B. The video playback circuit 214 includes the playback color phase processing circuit 204, the 1 H delay circuit 206, and the adder circuit 208 of FIG. 1B. The magnetic tape 200 is wrapped round on the circumferential surface of a rotary drum 216 over an angular range of 180-odd degrees. And magnets 220 and 222 are arranged at diametrically opposite positions on the drum 216. A drum pickup head 208 generates a pulse every time magnets 220 and 222 pass therethrough by the rotation of the drum 216. A first waveform shaping circuit 224 generates a drum flip-flop (hereinafter abbreviated as DFF) signal of which state varies every time it receives a pulse from the drum pickup head 218 (i.e., signal level changes from low level to high level or from high level to low level).

The DFF signal constitutes recording and playback color phase processing control signals for indicating the direction of rotation of the color phase to recording and playback color phase processing circuits 202 and 204 respectively assembled in the video recording and playback circuits 212 and 214.

Further, the conventional apparatus shown in FIG. 1D is constructed to switch outputs from two video recording/playback heads 226 and 228 mounted or affixed on the drum 216 by using the DFF signal as a control signal for a head switching circuit 230, in which outputs are selectively delivered to the video playback circuit 214 at the time of playback. Accordingly, the occurrence timings of the color phase processing control signal and the head switching control signal are the same.

At the time of recording, a vertical synchronizing signal separated from an input video signal by a vertical (V) synchronizing separation circuit 243 is subjected to waveform shaping by a second waveform shaping circuit 244. The signal thus obtained is then delivered to a control head 249 through a switch 246. Thus, it is recorded onto a control track of the magnetic tape 200 as a control signal. Further, a recording phase switching circuit 245 outputs a predetermined signal inverted every field in syncronism with the vertical synchronizing signal to a drum serve circuit 241 through a switch 247. The drum servo circuit 241 compares this signal with DFF signal to drive a drum motor 242 in correspondence with an error in that phase to control rotation of the drum 216.

At the time of playback, switches 246 and 247 are switched to the respective upper sides in FIG. 1D. A control head 249 plays back a control signal from the control track of the magnetic tape 200 to output it to a tracking adjustment circuit 249 through the switch 246. A signal adjusted by the tracking adjustment circuit 248 so that it has a predetermined phase is outputted to the drum servo circuit 241 through the switch 247. The drum servo circuit 241 compares the phase of this signal with that of DFF signal to drive the drum motor 242 in correspondence with an error signal thereof.

At the time of recording, an input video signal is subjected to a predetermined processing at the video recording circuit 212, and is then amplified by a recording amplifier 253. The signal thus obtained is delivered to heads 226 and 228 through switches 251 and 252 and is then recorded onto the magnetic tape 200. This recording video signal is outputted to a circuit (not shown) through a switch 256 and is then monitored.

Furthermore, signals played back by heads 226 and 228 are inputted to playback amplifiers 254 and 256 through switches 251 and 252 and are then amplified, respectively. The head switching circuit 230 selects one of outputs from playback amplifiers 254 and 255 in correspondence with the DFF signal to output it to the video playback circuit 214. The video playback circuit 214 implements demodulating processing to an input signal to output it to a circuit (not shown) through the switch 256.

The DFF signal is set to come before the vertical (V) synchronizing signal, e.g., in the vicinity of 6.5 H by the drum servo. At this time, a small quantity of phase shift with respect to a vertical synchronizing signal of a video signal may occur due to fluctuations of the drum servo, tracking adjustment at the time of playback, and fine shifts of the drum servo lock phase at the time of recording and playback. Accordingly, as shown in FIG. 1E, the state change point of the color phase processing control signal, i.e., the point for indicating the change of the direction of phase rotation would shift. As a result, the above-mentioned prior art has the following problems.

(1) At the time of recording, since the DFF signal shifts with respect to the phase of a vertical synchronizing signal by fluctuation of the drum servo, the state change point of the color phase processing control signal, i.e., the switching point for indicating the change of the direction of phase rotation shifts. For this reason, even if the state of the color phase processing control signal changes at a correct time point, the color phase processing switching points at the time of recording and that at the time of playback differ from each other on a tape, giving rise to color shift or disappearance of color.

(2) At the time of playback, DFF signal shifts with respect to the phase of the vertical synchronizing signal because of tracking adjustment or fluctuation of the drum servo. For this reason, even if color phase processing switching is correctly conducted at the time of recording, the phase processing switching point at the time of recording and that at the time of playback differ from each other, giving rise to color shift or disappearance of color.

(3) When both recording and playback are conducted by the above-described conventional apparatus, the phase processing switching point at the time of recording and that at the time of playback differ from each other. As a result, color shift or disappearance of color would occur in the vicinity of the phase processing switching point.

Second Prior Art

Another example different from the first-mentioned prior art of the technology for conducting a color phase control using the DFF signal will be described with reference to FIGS. 2A and 2B.

The DFF signal gives rise to a small quantity of phase-shift with respect to the vertical synchronizing signal of the video signal by fluctuations of the drum servo, tracking adjustment at the time of playback, and a fine shift of the drum servo lock phase at the time of recording and playback, etc. Accordingly, the state change point of the color phase processing control signal, i.e., the point for indicating the change of the direction of rotation would shift.

To solve such problems, there has been proposed a color phase processing control system in which a DFF signal responsive to an original DFF signal and a synchronizing signal included in a video signal and adjusted so that the state changes at a predetermined timing with respect to the synchronizing signal is used at the time of recording and playback as a color phase processing control signal.

Meanwhile, for the processing switching system in the state switching point of the color phase alteration rule, i.e., the state change point (transition point) of the color phase processing control signal, as shown in FIG. 2A, there are an "inversion on the spot" system to invert rotation from the last phase immediately before switching, and a "reset inversion" system having a reset phase to once reset a current phase to that phase immediately after switching, thereafter to invert rotation.

The configuration of a processing unit used for the color phase processing control is the same as that in the first-mentioned example shown in FIG. 1B. Namely, as shown in FIG. 1B, on the recording and playback sides of the apparatus, recording color phase processing circuit 202 and playback color phase processing circuit 204 are provided, respectively. The recording color phase processing circuit 202 and the playback color phase processing circuit 204 carry out exactly opposite processing to return a color phase to an original color phase. Further, a comb filter comprised of a 1 H delay circuit 206 and an adder circuit 208 adds an output from the playback color phase processing circuit 204 and an output from a 1 H delay circuit 206 for delaying it by one horizontal scanning interval (1 H) to cancel a crosstalk.

FIG. 2B shows an output from the recording color phase processing circuit 202, an output from the playback color phase processing circuit 204, and an output from the adder circuit 208, etc. in the case of switching the color phase alteration rule (i.e., switching the color phase processing control) using the "reset inversion" system at the time of recording, switching the color phase alteration rule (i.e., switching the color phase processing control) using "inversion on the spot" at the time of playback, and allowing switching points at the time of recording and playback to be in correspondence with each other.

Namely, the recording color phase processing circuit 202 implements rotation to a phase of a low frequency band color signal (hereinafter referred to as a color phase) $S_{11}$ by 90 degrees every 1 H to provide a color phase signal $S_{12}$ to store it onto the magnetic tape 200. The direction of the rotation is switched at a predetermined timing every field in correspondence with a recording color phase processing control signal.

A color phase signal $S_{13}$ reproduced or played back from the magnetic tape 200 is changed, at the playback color phase processing circuit 204, back to an original color phase signal $S_{14}$ in correspondence with a playback color phase processing control signal.

The color phase signal $S_{14}$ is added, at the adder 208, to a color phase signal $S_{16}$ delayed by 1 H by the 1 H delay circuit 206, resulting in a color phase signal $S_{16}$.

In the above-mentioned proposed color phase processing control systems, except for the case where this system is employed for both recording and playback (i.e., in the case of recording and playback by the same apparatus and in the case of compatible playback of this system), the switching point for the color phase processing control shifts, giving rise to color shift or disappearance of color at the time of playback.

Furthermore, where the color phase processing switching system at the time of recording and that at the time of playback are different from each other, even if the switching points are in correspondence with each other, color shift may occur as shown in FIG. 2B.

SUMMARY OF THE INVENTION

A principal object of this invention is to provide a helical scan type magnetic playback apparatus constructed to carry out head switching at a fixed position (timing) on a frame without undergoing influence of changes in the tension of a video tape or tracking adjustment in playing back or reproducing the video tape.

Another object of this invention is to provide a video tape recorder capable of preventing occurrence of color shift or disappearance of color even if the switching point of the color phase alteration rule, i.e., the switching point of the color phase processing control at the time of recording and that at the time of playback differ from each other.

A further object of this invention is to provide a video tape recorder capable of preventing occurrence of color shift even if the color phase processing switching system at the time of recording and that at the time of playback are different from each other.

More particularly, still further objects of this invention is to provide (1) a playback apparatus capable of preventing color shift or disappearance of color by modifying or correcting a shift or difference between the color phase processing switching point at the time of recording and that at the time of playback by a predetermined rule, (2) to provide a playback apparatus capable of preventing color shift, etc. by modifying or correcting such a shift between the switching point at the time of recording and that at the time of playback due to tracking adjustment at the time of playback and stability of the drum servo, and (3) to provide a playback apparatus which has eliminated inconvenience such as a color shift in the vicinity of the switching point, or the like which might be produced by the both causes at the times of recording and playback.

This invention contemplates attaining the above-mentioned objects. In a helical scan type magnetic playback apparatus according to this invention, there is provided a switching signal generator circuit responsive to a vertical synchronizing signal for a video signal obtained by playing back or reproducing a position signal from position sense means of a plurality of magnetic heads for switching video signals played back or reproduced by the magnetic heads to store the position signal after a first predetermined time has passed thereafter to read the stored position signal after a second predetermined time has passed to thereby conduct the above-mentioned switching.

Thus, head switching is carried out at a fixed timing with respect to video signals to be played back or reproduced. This permits provision of a helical scan type magnetic playback apparatus in which positions of switching points appearing on a frame can be fixed.

Namely, there is provided a helical scan type magnetic playback apparatus comprising a plurality of magnetic heads, position signal generator means for generating a position signal indicative of the position of the plurality of magnetic heads, and switching means responsive to a position signal from the position signal generator means to switch video signals played back or reproduced by the plurality of magnetic heads, the apparatus comprising first means responsive to a vertical synchronizing signal of the video signal to store the position signal after a first predetermined time has passed from the time when the vertical synchronizing signal is received, and second means responsive to the vertical synchronizing signal to read the position signal stored in the first means after a second predetermined time longer than the first predetermined time has passed from the time when the vertical synchronizing signal and output it.

A video tape recorder according to a first aspect is directed to a video tape recorder in which the phase of a low frequency band color signal is altered every track of a video tape on the basis of a predetermined rule, thereby allowing spectra of color signals not to overlap with each other between adjacent tracks, characterized by the provision of a color phase processing control signal generator circuit adapted to receive a drum flip-flop signal of which state varies in dependency upon changes in a rotational phase of a drum for playing back or reproducing a signal from a tape wound onto the outer circumference thereof and a synchronizing signal included in the video signal to output a modified drum flip-flop signal adjusted so that its state varies at a predetermined timing with respect to the synchronizing signal as a color phase processing control signal for designating the direction of alteration of a low frequency band color phase, and a phase alteration circuit for altering a low frequency band color phase on the basis of a predetermined rule in accordance with an output from the color phase processing control signal generator circuit.

A video tape recorder according to a second aspect is characterized in that the video signal is a recording video signal, and the phase alteration circuit serves to alter the low frequency band color phase at the time of recording the video signal.

A video tape recorder according to a third aspect is characterized in that the video signal is a playback video signal, and the phase alteration circuit serves to alter the low frequency band color phase at the time of playing back or reproducing the video signal.

A video tape recorder according to a fourth aspect is characterized in that there are further provided a plurality of video playback heads, a head switching circuit for switching outputs from these heads to deliver a switched one to the video playback circuit, and a delay circuit for delaying the drum flip-flop signal by a predetermined time, thus to deliver an output from the delay circuit to the head switching circuit as a head switching control signal.

A video tape recorder according to a fifth aspect is directed to a video tape recorder in which the phase of a low frequency band color signal is altered every track of a video tape on the basis of a predetermined rule, thereby allowing spectra of color signals not to overlap with each other between adjacent tracks, characterized by the provision of sense means for sensing an error of the phase of a low frequency band color signal produced at the time of playback by a shift between the switching point of a predetermined rule at the time of recording and the switching point of a predetermined rule at the time of playback, and control correction means for correcting the phase of a playback low frequency color signal in dependency upon a sense signal of a phase error outputted from the sense means.

A video tape recorder according to a sixth aspect is characterized in that the control correction means comprises timing means for setting a fixed period related to the vertical synchronizing signal obtained from the playback video signal, and gate means for taking out a phase error sense signal only for a fixed period.

A video tape recorder according to the seventh aspect further comprises a plurality of video playback head, a head switching circuit for switching outputs from these heads to a switched output to the video playback circuit, and a head switching control circuit for delivering, to the head switching circuit, as a head switching control signal, a modified flip-flop signal adjusted so that the state change point of a drum flip-flop signal of which state varies in dependency upon changes in the phase of rotation of the drum for playing back or reproducing a signal from the tape wound onto the outer circumference thereof is shifted up to the position after the range of a fixed period.

A video tape recorder according to an eighth aspect is characterized in that the gate means serves to take out only a first phase error within a fixed period, and that the control correction means serves to correct a playback color phase in accordance with a predetermined rule from the time point when an error sense signal is produced to the time point when the head switching control signal is produced.

In accordance with respective recorders according to the first to eighth aspects, the following functions or advantages are provided.

In the video tape recorder according to the first aspect, even if the DFF signal changes with respect to the synchronizing signal of the video signal by fluctuations of the drum servo, tracking adjustment, shift between the drum servo lock phase at the time of recording and that at the time of playback, or the like, the DFF signal is adjusted so that the state changes at a predetermined timing with respect to the synchronizing signal. Accordingly, the color phase processing switching point at the time of recording and that at the time of playback can be in correspondence with each other. Thus, color shift and/or disappearance of color can be prevented.

In the color phase processing control apparatus according to the second aspect, the DFF signal is adjusted so that the state changes at a predetermined timing with respect to the synchronizing signal. Accordingly, even if there is any fluctuation of the drum servo at the time of recording, by changing the state of the color phase processing control signal at a correct time point, there is no possibility that the color phase processing switching point at the time of recording and that at the time of playback differ from each other, resulting in no occurrence of color shift or disappearance of color.

In the color phase processing control apparatus according to the third aspect, DFF signal is adjusted so that the state changes at a predetermined timing with respect to the synchronizing signal. Accordingly, even if there is any fluctuation in the tracking adjustment or the drum servo at the time of playback, as long as the color phase processing switching is carried out at a correct time point at the time of recording, there is no possibility that the color phase processing switching point at the time of recording and that at the time of play back differ from each other, resulting in no color shift or disappearance of color.

In the video tape recorder according to the fourth aspect, the playback head is switched by a signal obtained by delaying the DFF signal. A user observes, on the monitor, by a delay time, a skew, etc. of the head switching unit, which becomes conspicuous in the case where the possibility of color shift or disappearance of color becomes null as a result of the fact that a difference between the switching point (transition point) of the state of the color phase processing control signal at the time of recording and that at the time of playback becomes equal to zero, thus to permit such a skew to be positioned at a lower portion which is outside the screen.

In the video tape recorder according to the fifth aspect, since an error of the color phase is sensed to make a correction so that a correct phase results, occurrence of disappearance of color or color shift can be prevented. Accordingly, even if the switching point of the color phase alteration rule at the time of recording and that at the time of playback are not in correspondence with each other and/or even if the color phase alteration rule switching system and that at the time of playback are different from each other, an error in the phase can be corrected. Thus, color shift and disappearance of color can be prevented.

In the video tape recorder according to the sixth aspect, a phase error sense signal can be taken out for a fixed period related to the vertical synchronizing signal. Namely, an error in the phase only in the vicinity of the switching point of the color phase control signal can be sensed. Thus, an erroneous operation can be prevented.

In the video tape recorder according to the seventh aspect, since switching of the playback head can be shifted after a phase error is sensed, there is no possibility that the head might be switched during the color phase correction. Accordingly, the possibility that switching of the video head is conducted is eliminated. Thus, an erroneous operation can be prevented.

Finally, in accordance with the video tape recorder according to the eighth aspect, it is sufficient to implement delay for error correction only to an initial phase error, so hardware becomes simplified and cost can be reduced. Namely, since a phase initially sensed is only used and correction will be made in accordance with a predetermined rule after that, only a time for an initial phase error correction is eventually delayed.

BRIEF DESCRIPTION OF THE DRAWINGS

In the accompanying drawings:

FIG. 1C is a vector diagram showing the relationship between respective signals in FIG. 1B; FIG. 1D is a block diagram showing the configuration of an example of a conventional video tape recorder.

FIG. 2A is an explanatory view of the "inversion on the spot" system and the "reset inversion" system for switching the color phase processing.

DETAILED DESCRIPTION OF THE PREFERRED EMBODIMENTS

Preferred embodiments of playback apparatus according to this invention will be described in detail with reference to the attached drawings.

First Embodiment

A playback apparatus according to a first embodiment will be described with reference to FIGS. 1 to 3.

Figure 1:
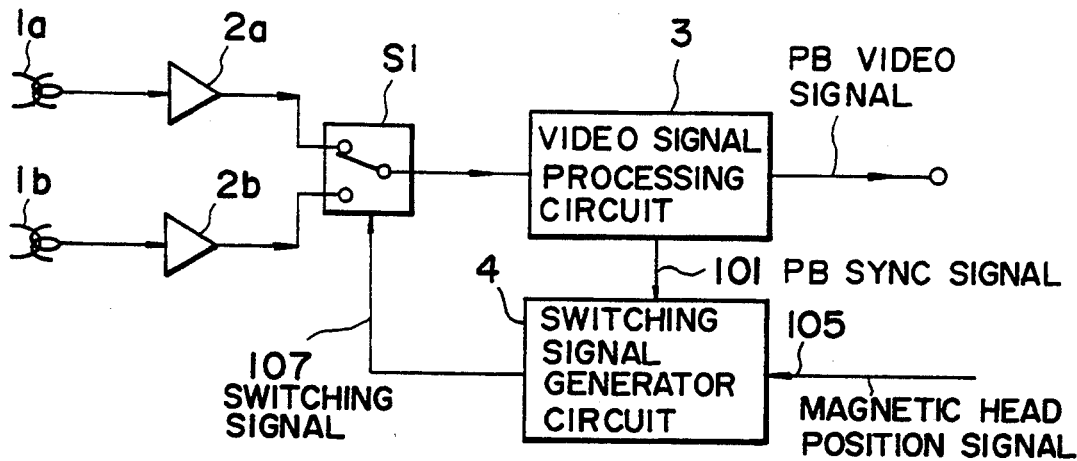
FIG. 1 is a block diagram of a head switching circuit of a helical scan type magnetic playback apparatus according to first and second embodiments of this invention.

In FIG. 1, playback signals from a video tape (not shown) are inputted to amplifiers 2a and 2b by two magnetic head 1a and 1b disposed opposite to each other with an angular distance of the 180 degrees therebetween on a rotary drum (not shown), and are then amplified thereat, respectively. Outputs from the amplifiers 2a and 2b are inputted to a switch S1. A switch S1 switches the playback signals from the two magnetic heads 1a and 1b in response to a switching signal 107. Thus, the signal from the magnetic head 1a or 1b in contact with the video tape is outputted to a video signal processing circuit 3. The video signal processing circuit 3 generates a playback video signal of the NTSC system, i.e. (National Television System Committee) color system, etc. and outputs a playback synchronizing signal 101 to a switching signal generator circuit 4. To the switching signal generator circuit 4, a signal indicative of the position of the magnetic head, i.e., the rotational position of the rotary drum. This signal is a magnetic head position signal 105, which is switched when the magnetic heads 1a and 1b reach respective predetermined positions. This signal is also called "drum flip-flop signal". The switching signal generator circuit 4 stores this magnetic head position signal 105 after a first predetermined time has passed upon receiving the playback synchronizing signal 101 to store information to the effect that a signal from any one of magnetic heads 1a and 1b is to be played back thereafter to output the magnetic head position signal 105 stored after a second predetermined time has passed upon receiving the playback synchronizing signal 101. An output from the switching signal generator circuit 4, i.e., a switching signal 107 switches the above-mentioned switch S1.

The second predetermined time is set to a value shorter than the period of the vertical synchronizing signal by 3 H (horizontal scanning interval). Accordingly, the timing at which the switch S1 is switched, i.e., the switching point is fixed to the time point 3 H before the timing of the playback video signal, and is thereby fixed on the playback frame (monitor screen). In this embodiment, the rotation of a rotary drum (not shown) is controlled by the magnetic head position signal 105. In this way, even if the phase relationship between the magnetic head position signal 105 and the playback video signal varies, e.g., by tracking adjustment, etc., it is possible to switch the switch S1 at a predetermined switching point with respect to the playback video signal. Since the switching point is fixed in this way, it is possible to set the switching point immediately before the vertical synchronizing signal.

Figure 2:
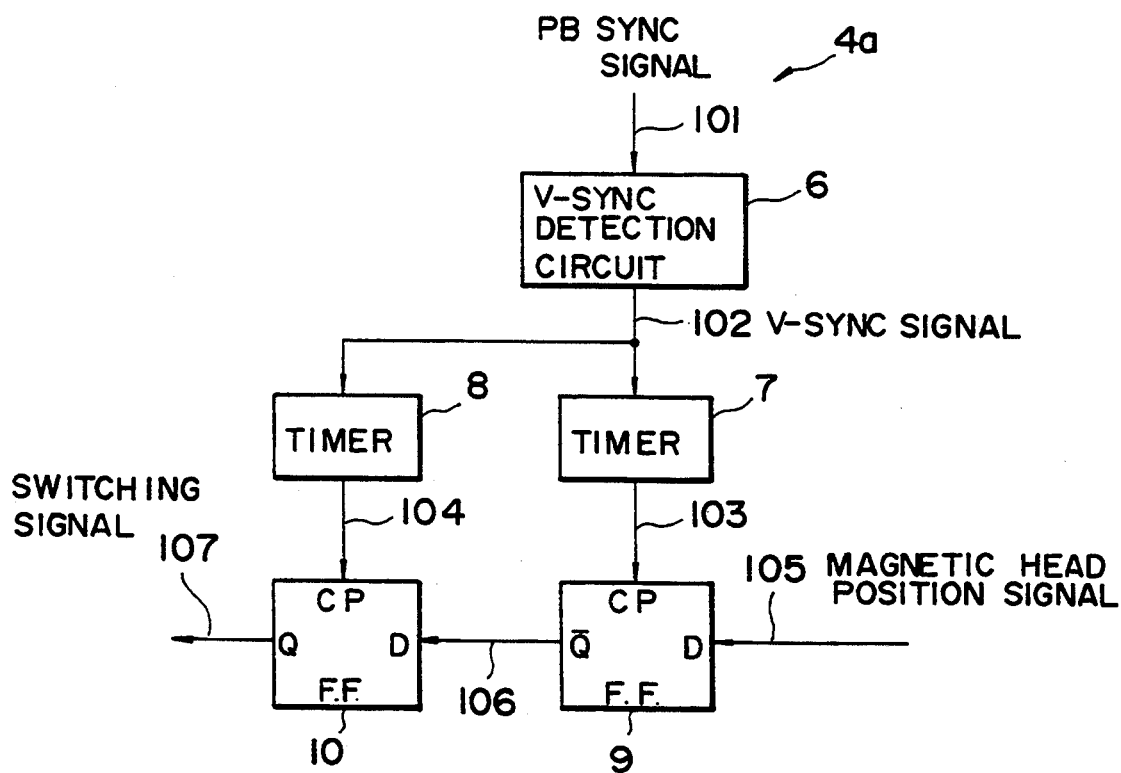
FIG. 2 is a block diagram of a switching signal generator circuit employed in the first embodiment.
Figure 3:
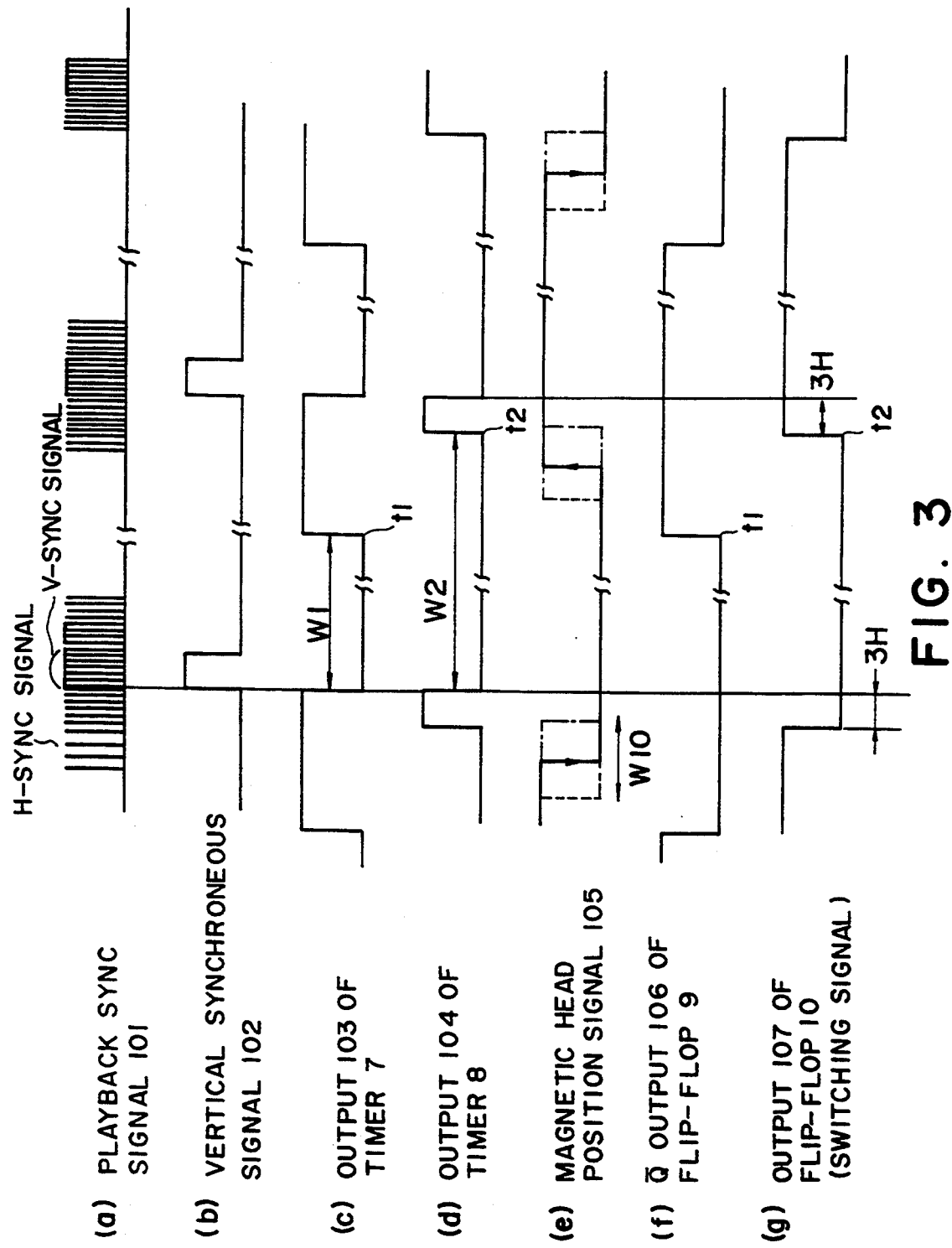
FIG. 3 is a waveform diagram for explaining the first embodiment.

FIG. 2 is a block diagram of a switching signal generator circuit 4a used for the head switching circuit of the first embodiment shown in FIG. 1. Further, waveforms on respective components are shown in FIG. 3. In FIG. 2, the playback synchronizing signal 101 is inputted to a vertical synchronizing signal sense circuit 6. Thus, the vertical synchronizing signal 102 is sensed. This vertical synchronizing signal 102 is outputted to timers 7 and 8. The timer 7 outputs, to the clock input cp of a D-type flip-flop (F.F.) 9, an output signal 103 of which output becomes L (low level) in response to the vertical synchronizing signal 102 and becomes H (high level) after a predetermined time W1 has passed, i.e., at t1. The flip-flop 9 holds, at $\bar{Q}$ output hereof the signal level of the magnetic head position signal 105 inputted to the D input in response to the output signal 103 from the timer 7. Thus, the flip-flop 9 can store the magnetic head position signal 105 at a stable level of the magnetic had position signal 105. Since the change point shifts or moves by tape tension, etc. as indicated by a variation width WIO in the magnetic head position signal 105, a measure is taken in order not to undergo such an influence. The timer 8 outputs, to the clock input cp of a flip-flop 10, an output signal 104 of which output level becomes L in response to the synchronizing signal 102 and becomes H after a predetermined time W2 has passed, i.e., at t2. The flip-flop 10 holds, at the Q output thereof, the signal level of the $\bar{Q}$ output of the flip-flop 9 in response to the output signal 104. Namely, a switching signal generator circuit 4a stores the magnetic head position signal 105 after a predetermined time W1 has passed from the time when the playback synchronizing signal 101 has been received to output it as a switching signal 107 after a predetermined time W2 has passed, i.e., at t2. This timing t2 is set to the timing 3 H before the next vertical synchronizing signal. Thus, a timing later than that in the prior art can be taken.

The above-mentioned head position signal 105 is a binary signal varying at a time point during overlapping period. The overlapping period is defined as a time during which both the two heads 1a and 1b are in contact with the tape by winding the tape onto the drum by an angle of "180+α degrees". For example, when the above-mentioned signal 105 is at H level, the head 1a is in contact with the tape, and when it is at L level, the head 1b is in contact with the tape.

Since the above-mentioned signal 105 is not sensed from respective heads 1a and 1b, and is sensed by independent drum rotation phase sensor means including a pickup head, etc., it does not necessarily corresponds to a signal recorded on the tape. Accordingly, the timing of this signal is shifted with respect to the above-described vertical synchronizing signal 102, etc. for the reasons below:

(a) Where the heights of heads affixed or mounted on the outer circumferential surface of the rotary drum of the recording apparatus and those of the playback apparatus are different from each other, respective timings of signals 102 and 105 would be different from each other. In the apparatus of the helical scan type, vertical synchronizing signals on respective tracks obliquely formed at specified positions in parallel with the width of the tape. Accordingly, when the heights for mounting of heads are different from each other, the sense timing of a position signal at the time of playback differs from that at the time of recording. For this reason, the switching point is shifted or moved.

(b) When tracking at the time of playback is changed, the timing of a head position signal with respect to the vertical synchronizing signal 102 shifts. Particularly, in the case of the helical scan type, when the tracking is changed, the switching point is shifted with respect to signals recorded on a tape.

(c) Where a tension of a video tape at the time of recording and that at the time of playback are different from each other, a positional shift in a running direction of the tape occurs in the same manner as in the item (b). Thus, the switching point would be shifted.

Furthermore, predetermined times W1 and W2 in respective outputs 103 and 104 of the timers 7 and 8 are set as follows. The predetermined time W1 is set to a time shorter than the minimum time required until the magnetic head position signal 105 after the vertical synchronization varies, e.g., "V period − 15 H", where V period is one vertical scanning period. On the other hand, when a switching signal is outputted before nH of the vertical synchronization, the predetermined time W2 is set to "V period − nH". For example, W2 is set to "V period − 3 H".

Since the helical scan type magnetic playback apparatus according to the first embodiment is constructed as explained above, the advantages described below are provided.

In the first embodiment, there is provided the switching signal generator circuit to store a position signal from the position sensor means of the magnetic head for switching video signals played back by a plurality of magnetic heads in response to the played back video signal after a first predetermined time to carry out such a switching after a second predetermined time. Thus, since head switching is carried out at a fixed timing with respect to a played back video signal, a helical scan type magnetic playback apparatus capable of fixing the position of the switching point on a frame can be provided. Accordingly, while there are instances in the prior art where the switching point is present at a time point of about 6.5 H before the vertical synchronizing signal and noises resulting from this would appear with the screen, this embodiment can set the switching point at a time point immediately, e.g., 3 H before the vertical synchronizing signal. Thus, the switching point can be set at a timing corresponding to the invisible position at a lower portion of the screen. For this reason, noises in switching are not conspicuous. Further, even in the case where a video tape recorded by different magnetic recording apparatus is played back, or tracking adjustment is made, noises in switching are not conspicuous.

Second Embodiment

A playback apparatus according to a second embodiment of this invention will be described in detail with reference to FIGS. 1 and 4 to 9. The configuration of the head switching circuit in the apparatus of the second embodiment is substantially the same as that of the first embodiment and respective explanation will be omitted.

Figure 4:
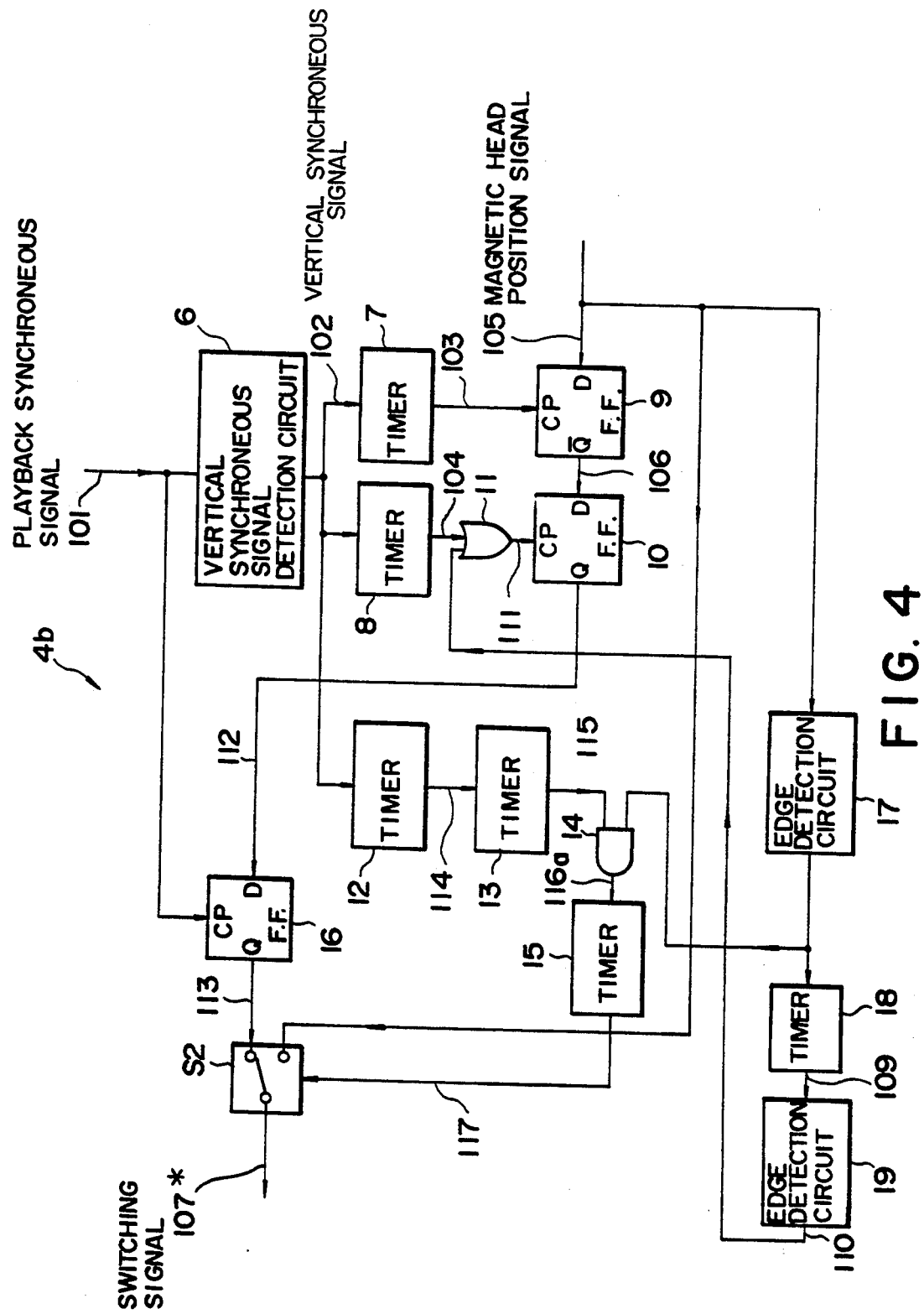
FIG. 4 is a block diagram of switching signal generator circuit employed in the second embodiment.
Figure 5:
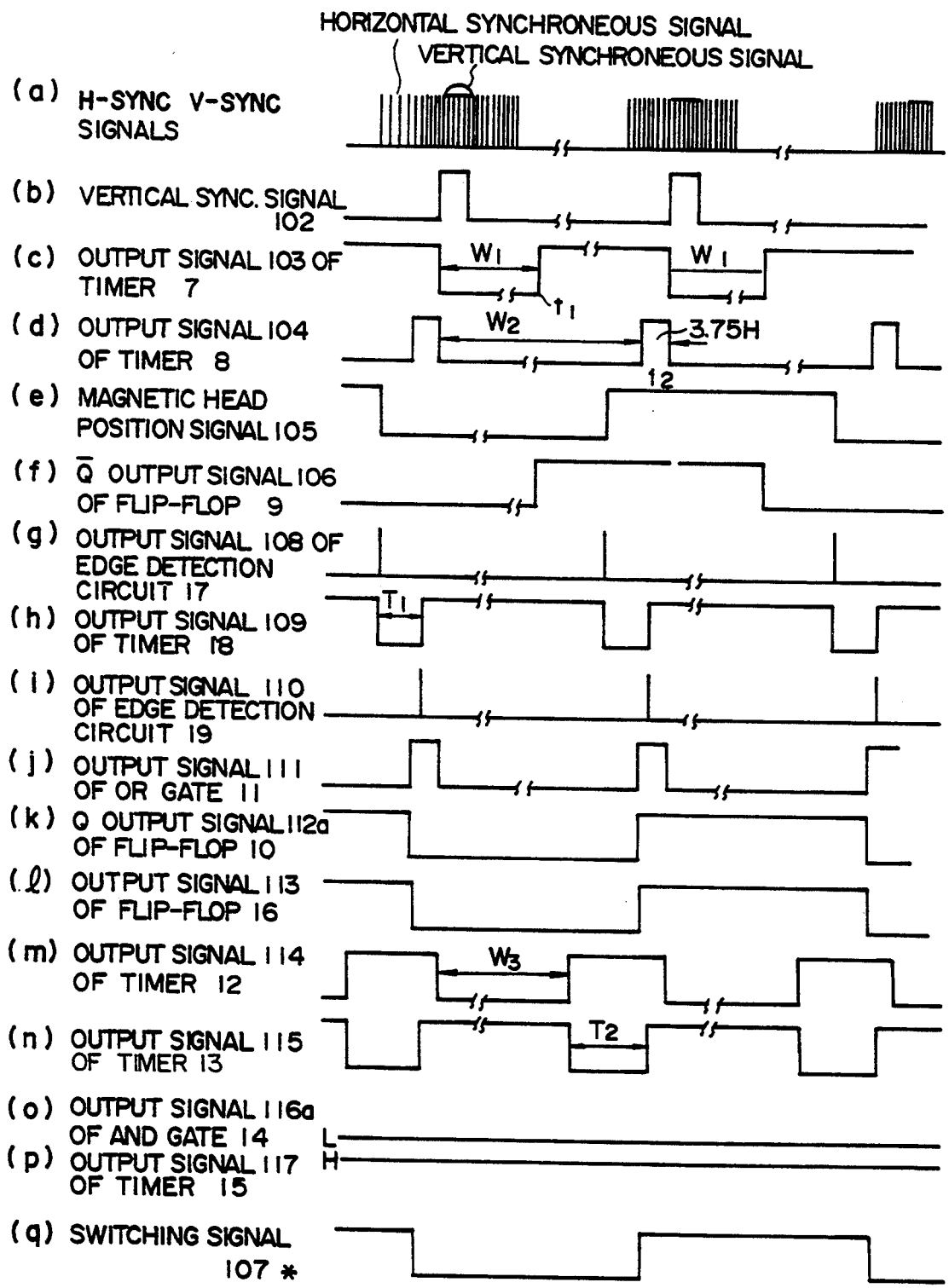
FIGS. 5 to 9 are waveform diagrams for explaining the second embodiment, respectively.
Figure 6:
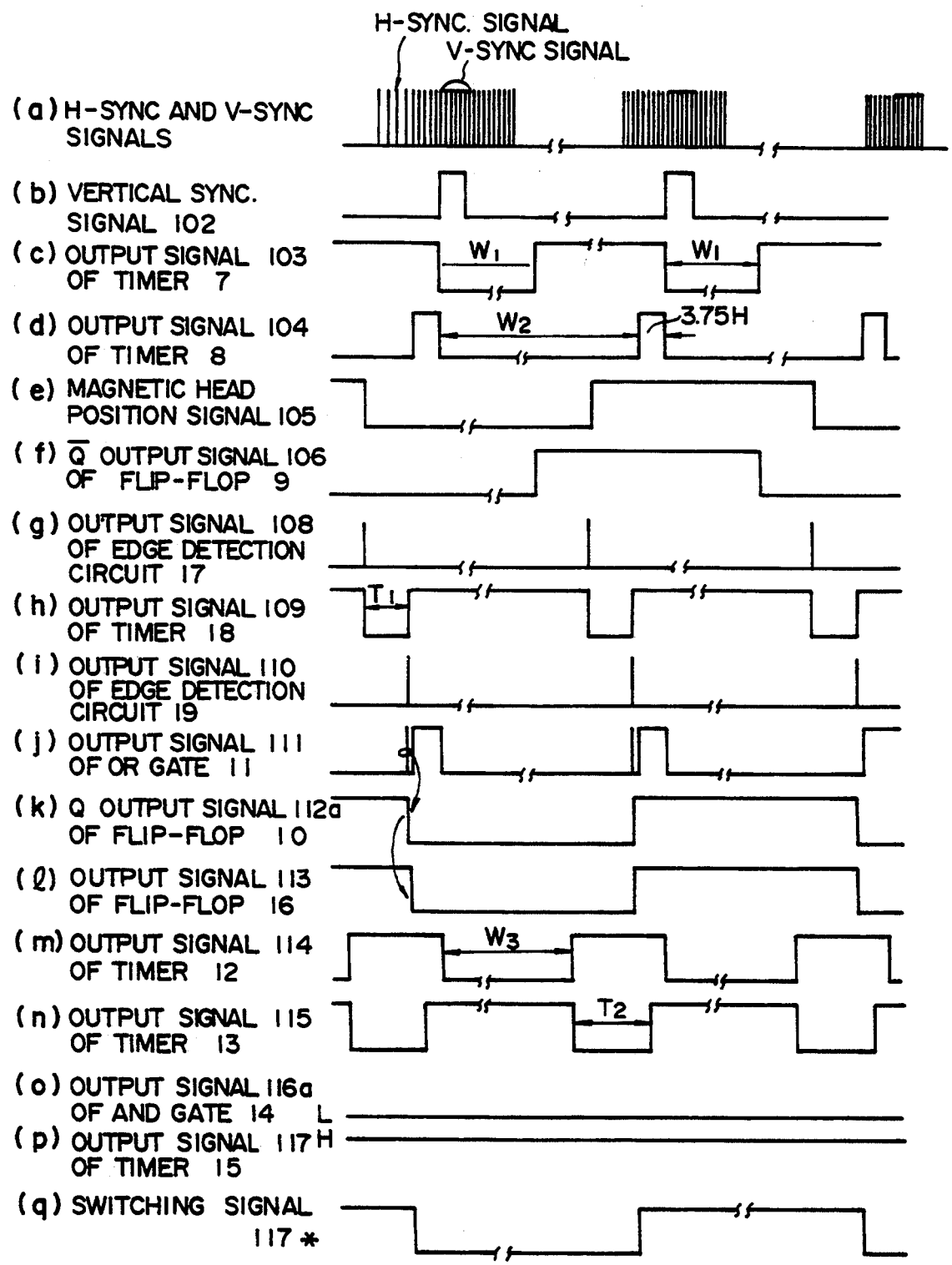
Figure 7:
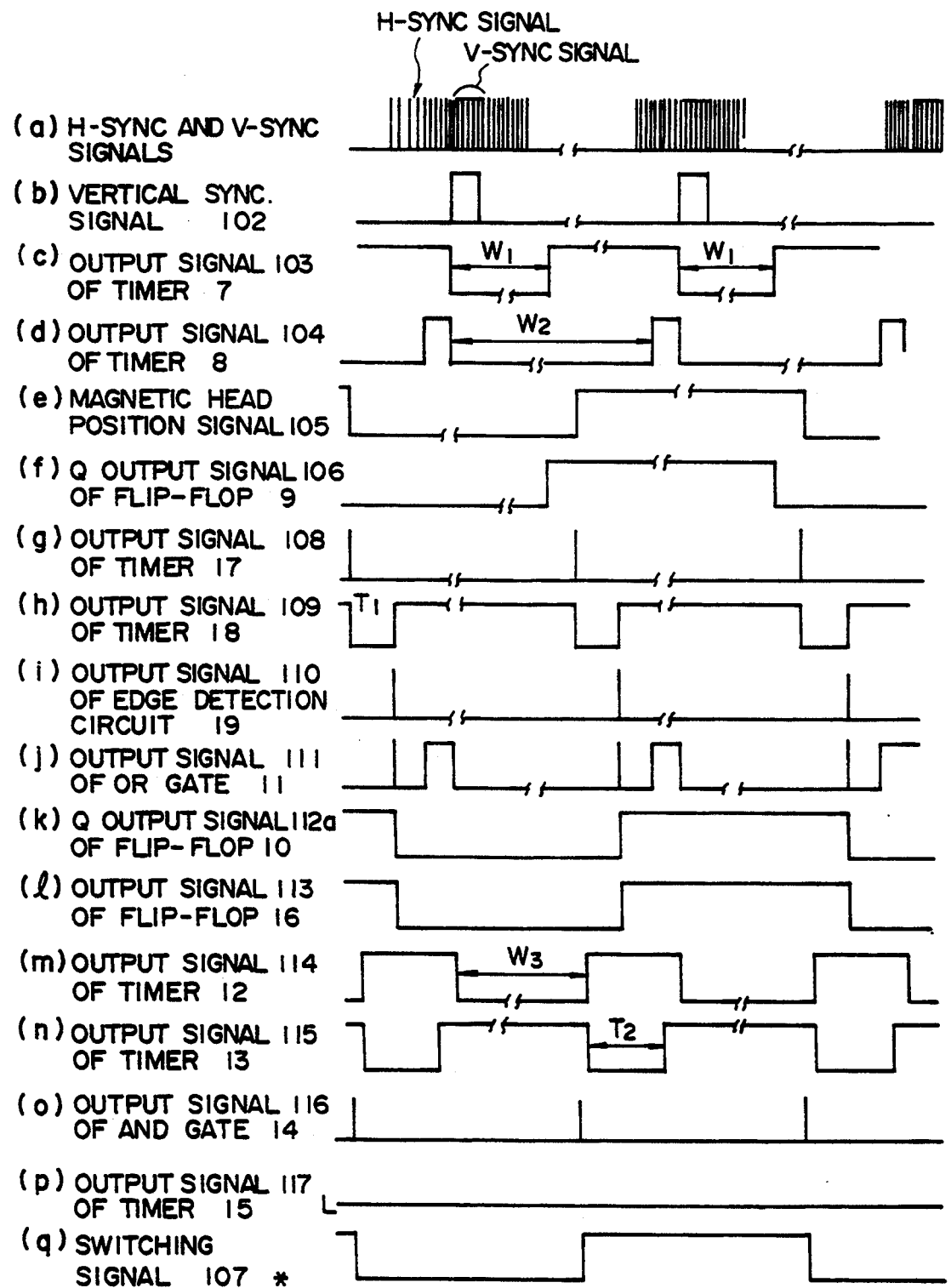

FIG. 4 is a block diagram of a switching signal generator circuit 4b used in the head switching circuit of the second embodiment shown in FIG. 1. Waveforms on respective components in the block diagram of FIG. 4 are shown in FIG. 5 to 9. FIG. 5 shows that changes in the magnetic head position signal 105 takes place within the time width T1 which will be described with respect to a played back vertical synchronizing signal 102. Likewise, FIG. 6 shows that such changes fall within the time width T2, which will be described later, longer than the time width T1, and FIG. 7 shows that such changes do not fall within the time width T2.

In FIG. 4, a playback synchronizing signal 101 is inputted to a vertical synchronizing signal sense circuit 6. Thus, a vertical synchronizing signal 102 is sensed. This vertical synchronizing signal 102 is outputted to timers 7 and 8. The timer 76 outputs, to the D input of the D-type flip-flop (F.F) 9, an output signal 103 of which output level becomes L in response to the vertical synchronizing signal 102 and becomes H after a predetermined time w1. i.e., at time t1. The flip-flop 9 holds the signal level of the magnetic head position signal 105 inputted to the D input at the level of Q output in response to the output signal 103 of the timer 7. Thus, the flip-flop 9 can store the magnetic head position signal at a stable level of the magnetic head position signal 105.

The timer 8 passes an output signal 104 of which output level becomes L in response to the synchronizing signal 102 and becomes H after a predetermined time W2, i.e., at time t2 through an OR gate 11 to output it to the clock input cp of the flip-flop 10. The flip-flop 10 holds the signal level of the Q output of the flip-flop 9 at the level of the Q output in response to the output signal 104 of the timer 8.

On the other hand, the magnetic head position signal 105 is further applied to the edge sense circuit 17 and the switch S2. An edge sense circuit 17 senses a change point of the head position signal 105 to output an output signal 108 of the edge sense circuit 17 shown in FIG. 5 to a timer 18 and an AND gate 14. The timer 18 outputs an output signal 109 therefrom indicative of a predetermined time width T1 to an edge sense circuit 19.

The edge sense circuit 19 senses the rise edge of the output signal 109 from the timer 18 to output an output signal from the edge sense circuit 19 to the above-mentioned OR gate 11. The flip-flop 10 responding to an output signal from the OR gate 11 serves to respond to the output signal 110 from the edge sense circuit 19 or the output signal 104 from the timer 8. Accordingly, in the case of the timing shown in FIG. 5, since the output signal 110 from the edge sense circuit 19 indicated by H level is within H level period of the output signal 104 from the timer 8, it becomes the output signal 111 from the OR gate 11 shown in FIG. 5. Further, the Q output from the flip-flop 10 becomes a Q output signal 112a from the flip-flop 10 shown in FIG. 5. This Q output signal 112a is outputted to the D input of the flip-flop 16. The flip-flop 16 is placed in the state where the playback synchronizing signal is inputted to the CP input thereof. This flip-flop 16 responds to a horizontal synchronizing signal in the playback synchronizing signal 101 immediately after the Q output signal 112a from the flip-flop 10 is inputted to the D input of the flip-flop 16 to hold the level inputted to the Q output to output the output signal 113 from the flip-flop 16 to the switch S2.

Figure 8:
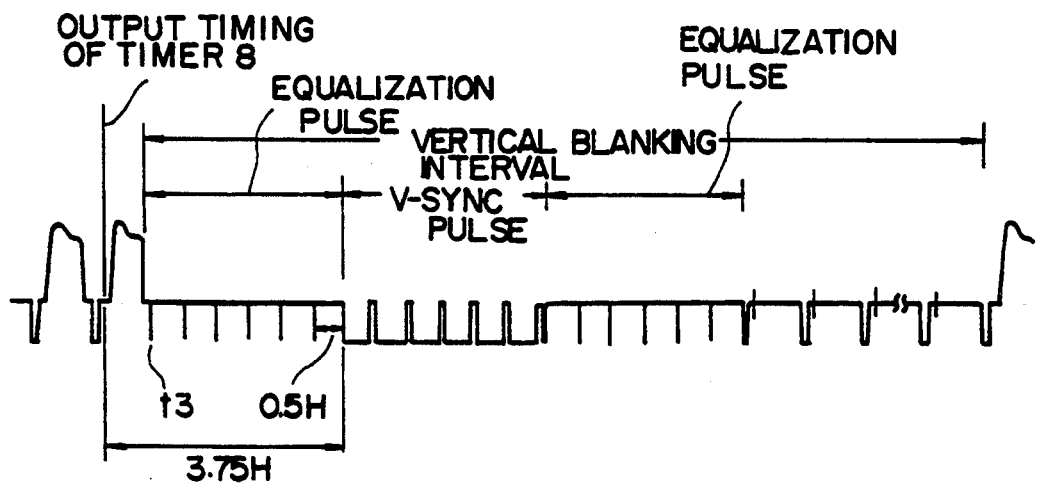
Figure 9:
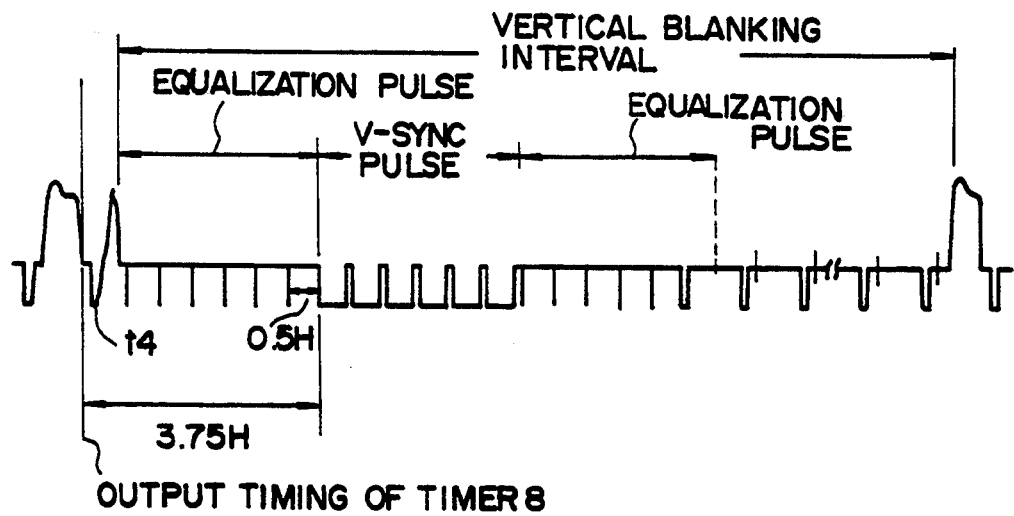

Accordingly, switching is carried out in a horizontal banking period. Thus, switching noises are prevented from appearing on a frame. For example, as shown in FIG. 8, switching of head is carried out, in a certain field, at timing t3 where the horizontal synchronizing signal appears immediately after the output timing of the timer 8 set to 3.75 H of the vertical synchronizing signal. Furthermore, in the next field, as shown in FIG. 9, switching of head is carried out at timing t4, i.e., at a time point before 3.5 H of the vertical synchronizing signal 102.

On the other hand, the vertical synchronizing signal 102 is also inputted to the timer 12. The timer 12 outputs, to the timer 13, an output signal 114 from the timer 12 varying after a predetermined time W3. The timer 13 responds to the timer 12 to output, to the AND gate 14, an output signal 115 from the timer 13 varying after a time width T2. Accordingly, in the case of the timing shown in FIG. 5, an output from the AND gate 14 remains at L level. Namely, it can be said that a phase difference between the vertical synchronizing signal 101 and the magnetic head position signal falls within the time width T2. In this case, the output signal 116a from the AND gate 14 results. This signal is outputted to the timer 15. Thus, the timer 15 is outputting H level. As a result, the switch S2 outputs an output from the flip-flop 16 as a switching signal 107. For this reason, the switch S1 is switched after a predetermined time has passed with respect to the vertical synchronizing signal.

In the case where the change in the magnetic head position signal 105 takes place at a rate faster than a timing as shown in FIG. 6, i.e., a timing of the output from the timer 8, since a signal from the edge sense circuit 19 is outputted slightly earlier than the output signal 104 from the timer 8, the flip-flop 10 responds to an output signal 111 from the OR gate 11 to hold the Q output at L level. The flip-flop 16 responds to a horizontal synchronizing signal immediately thereafter to hold the Q output at L level. On the other hand, since an output signal 108 from the edge sense circuit 17 takes place within the time width T2 indicated by an output signal from the timer 13, the timer 15 responding to these signals which have passed through the AND gate 14 becomes inactive. As a result, the switch S2 is not switched. Such an approach does not result in the fact that the switching point is not fixed on a playback frame as in the case shown in FIG. 5. However, the switching point is caused to be closer to the vertical blanking period with the time width T1 as a limit by the switching timing indicated by the magnetic head position signal 105. Thus, the switching point is located below the screen, and is not therefore conspicuous.

Reference is now made to a timing as shown in FIG. 7, i.e., the case where changes in the magnetic head position signal take place earlier than the time width T2. In this case, for the reason why the switching point is entered into the playback frame to much extent, and for the reason why the vertical synchronizing signal is not correctly played back or reproduced in such a case, switching of the switch S1 is carried out by the magnetic head position signal 105. Accordingly, a measure is taken such that failure of playback of a video signal so called FM missing phenomenon does not occur.

For this reason, in the case of the timing shown in FIG. 7, the AND gate 14 responds to an output signal 116 from the timer 13 and an output signal 115 from the edge sense circuit 17 to output a pulse as indicated by the output signal 116 from the AND gate 14 to the timer 15. Since the set time of the timer 15 is longer than the vertical synchronization period, if such a state is continued, the timer 15 is retriggered. As a result, an output of L level is continued. Thus, the switch S2 outputs the magnetic head position signal 105 as a switching signal 107' to the switch S1.

the predetermined time W3 in the output signal 114 of the timer 12 shown in FIGS. 5 to 7 is set as follows. Namely, if a time required until a magnetic head position signal after vertical synchronization changes is less than the above-mentioned time W3, this time is a time in which playback of signals should be judged to be extraordinary. For example, the time W3 is set to, e.g., "V period−20 H".

The advantages with the second embodiment are as follows.

In the helical scan type magnetic playback apparatus of the second embodiment, with a view to carrying out a switching as mentioned above, there is provided switch S2 so that the switching signal can be generated also by the head position signal. This prevents switching from being delayed to such an extent that video signal cannot be played back when playing back a video tape recorded by other magnetic recording apparatus. Accordingly, in the above-mentioned first embodiment, where head switching is delayed to such an extent that the video signal cannot be played back, the video signal would be played back as a white peak level. For this reason, there occurs the problem that buzz interference might occur with respect to the sound signal. However, the second embodiment can prevent this. Furthermore, where the switching is not delayed to such an extent that the video signal cannot be played back, but is delayed to considerable extent, head switching can be delayed by a fixed quantity, resulting in that the switching noise is not conspicuous.

Third Embodiment

A third embodiment of this invention will be described.

Figure 10:
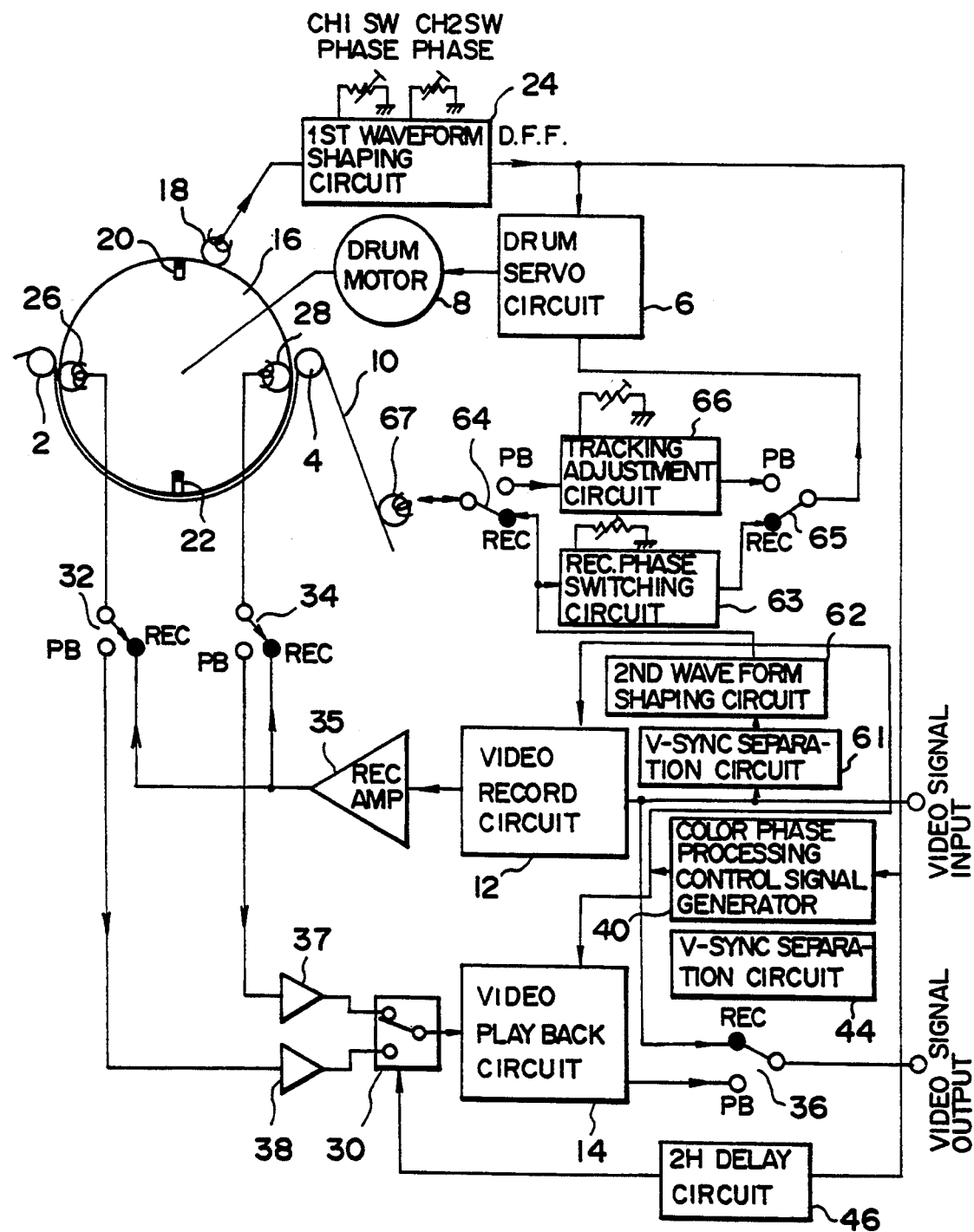
FIG. 10 is a block diagram showing the configuration of a third embodiment of a video tape recorder according to this invention.

FIG. 10 is a block diagram showing the configuration of an embodiment of a video tape recorder according to this invention. Loading poles 26 and 27 serve to draw out a video tape 50 from a cassette at the time of loading a video tape cassette (not shown) to wind it onto the outer circumference of a drum 20A. the drum 20A is driven by a drum motor 29 rotating under control of a drum servo 28. At first and second positions where rotational positions are different from each other by an angle of 180 degrees on the drum 20A, magnets 21 and 22 are disposed, respectively. A drum pickup head 20 generates a pulse every time the magnets 21 and 22 passes through the pickup head 20 by the rotation of the drum 20A. A first waveform smoothing circuit 23 generates a drum flip-flop (hereinafter abbreviated as DFF) signal of which state varies every time it receives a pulse (i.e., the signal level varies from L level to H level, or from H level to L level). Accordingly, the state of the DFF signal changes in dependency upon changes in the phase of rotation of the drum 20A.

Figure 1A:
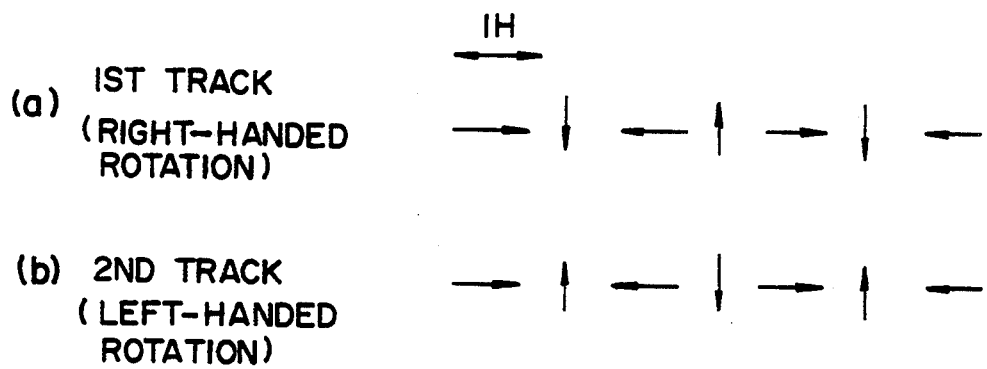
FIG. 1A is a vector diagram for explaining an example of the rule for altering the low frequency band color phase at the time of recording.
Figure 1B:
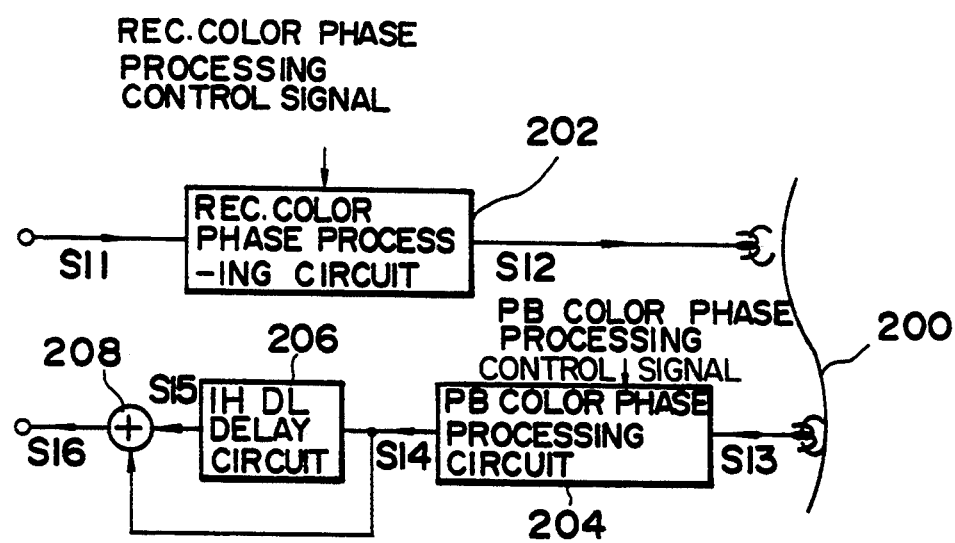
FIG. 1B is a block diagram showing the configuration of an example of conventional color phase processing units on the recording and playback sides.

A video recording circuit 51 includes a recording color phase processing circuit 202 shown in FIG. 1B. A video playback circuit 52 includes a playback color phase processing circuit 204, a 1 H delay circuit 206, and an adder circuit 208 shown in FIG. 1B. The video recording circuit 51 receives a video signal input at the time of recording (REC) to deliver a video signal of which low frequency band color phase is subjected to alteration (rotation) on the basis of a predetermined rule shown in FIG. 1C through a recording amplifier 35, a switch 32, and a switch 34, to video heads 24 and 25 disposed on the outer circumference of the drum 20A. It is to be noted that switches 32 and 34 are connected to the REC side at the time of recording and are connected to the PB side at the tie of playback. Furthermore, an input video signal delivered from the external at the time of recording is delivered to the external as a video signal output through a switch 36 connected to the REC side, and is then monitored.

The video playback circuit 52 alternatively receives video signals played back from the tape 50 by means of video heads 24 and 25 at the time of playback through the switches 32 and 34, the playback amplifiers 37 and 38, and the head switching circuit 30 to make an alteration (rotation) of a low frequency band color phase on the basis of a predetermined rule shown in FIG. 1C to output it to the external as a playback video signal.

The vertical (V) synchronous separation circuit 44 senses a vertical synchronous signal included in the playback or recording video signal outputted from the switch 36. The color phase processing control signal generator 40 receives a DFF signal, and a vertical synchronizing signal sensed by the vertical synchronous separation circuit 44 to output, to the video recording circuit 51 and the video playback circuit 52, a DFF signal adjusted so that the state (signal level) changes at a predetermined timing with respect to the vertical synchronizing signal as a color phase processing control signal for designating the direction of alteration (the direction of rotation) of the color phase.

A recording color phase processing circuit 204 and a playback color phase processing circuit 204 respectively assembled in the video recording circuit 51 and the video playback circuit 52 alter the low frequency band color phase on the basis of the rule shown in FIGS. 1A and 1C in accordance with the color phase processing control signal (i.e., in a direction of rotation indicated by that signal).

The delay circuit 46 delivers, to the head switching circuit 30, a signal obtained by delaying the DFF signal by two horizontal scanning period (2 H) as a switching control signal.

At the time of recording, a vertical synchronizing signal separated by the vertical (V) synchronous separation circuit 61 from the input video signal is subjected to waveform shaping by the second waveform shaping circuit 62. The signal thus obtained is delivered to the control head 67 through the switch 64, and is then recorded onto the control track as a control signal. Further, the recording phase switching circuit 63 outputs a predetermined signal inverting every field in synchronism with a vertical synchronizing signal to the drum servo circuit 6 through the switch 65. The drum servo circuit 28 compares this signal with the DFF signal to drive the drum motor in correspondence with a phase error signal to control the rotation of the drum 20A.

At the time of playback, the switches 64 and 65 are switched to the upper side in the figure. The control head 67 plays back a control signal from the control track to output it to the tracking adjustment circuit 66 through the switch 64. The signal adjusted so that it has a predetermined phase at the tracking adjustment circuit 66 is outputted to the drum servo circuit 28 through the switch 65. The drum servo circuit 28 compares the phase of this signal with that of the DFF signal to drive the drum motor 29 in correspondence with an erroneous signal.

Figure 11:
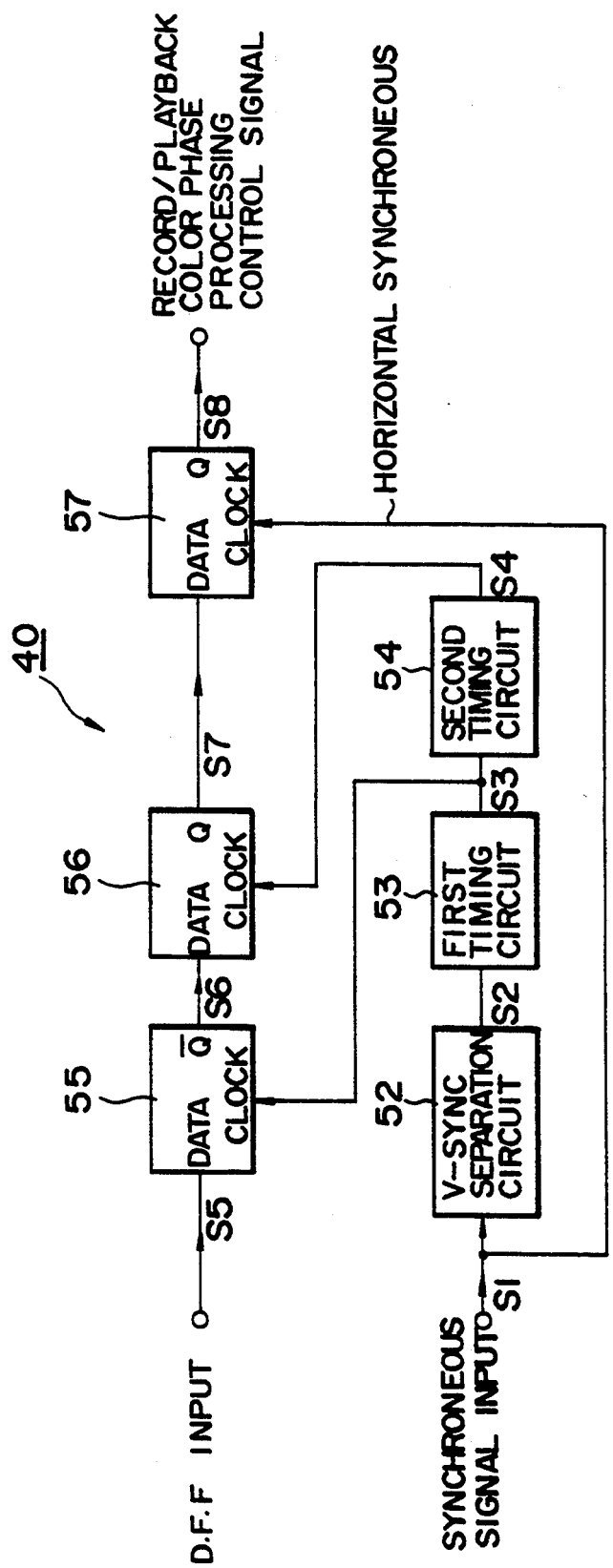
FIG. 11 is a block diagram showing the configuration of an example of a color phase processing control signal generator.

FIG. 11 shows an example of the detailed configuration of the color phase processing control signal generator 40 shown in FIG. 10. The color phase processing control signal generator 40 shown in FIG. 11 is composed of first and second timing circuits 53 and 54, and three D-type flip-flops 55, 56 and 57.

Figure 12:
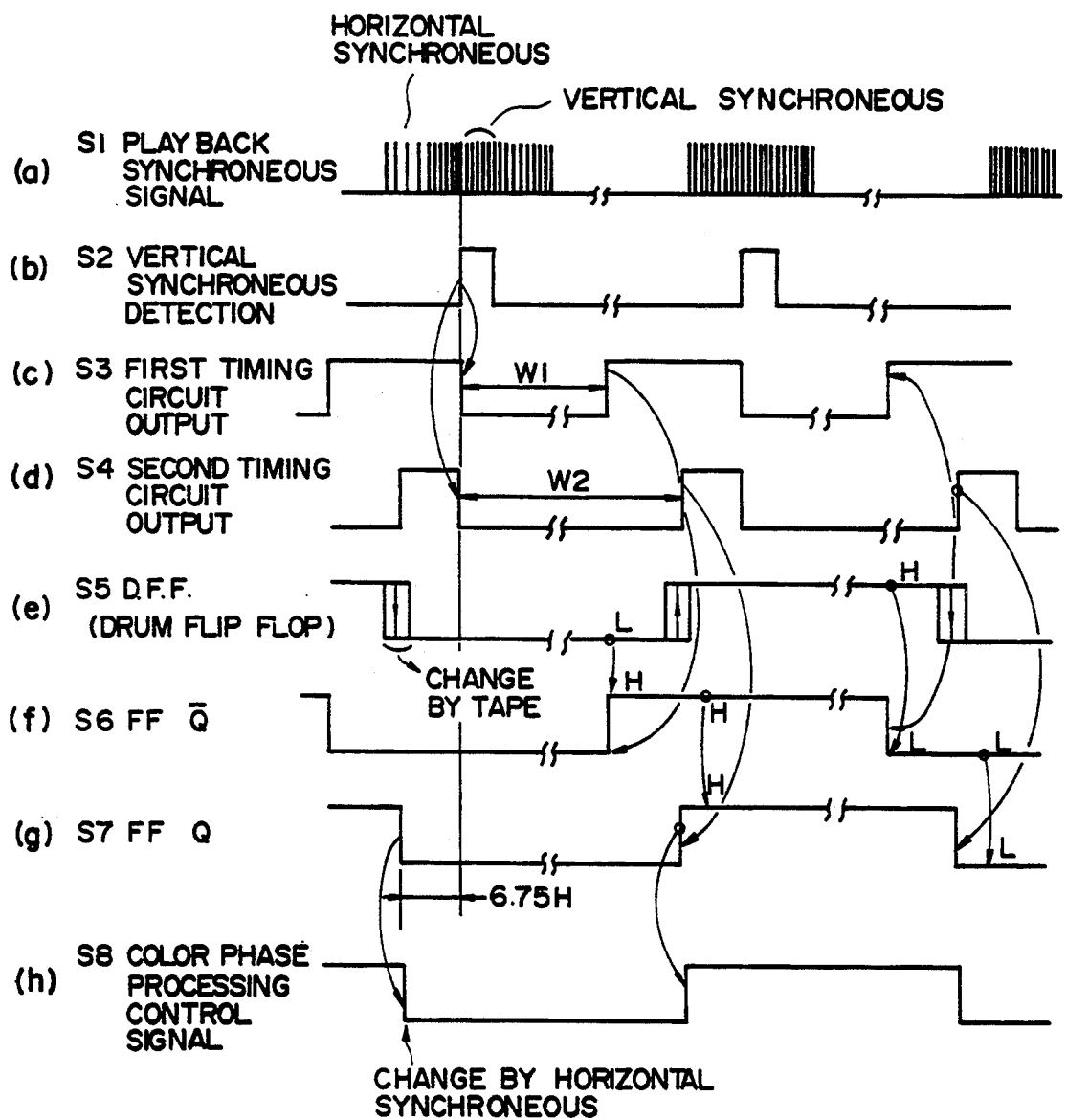
FIG. 12 is a waveform diagram of signals on respective components of the color phase processing control signal generator shown in FIG. 11.

The vertical synchronous separation circuit 44 detects a vertical synchronizing signal from the input signal S1 (FIG. 12) to output a detection signal S2 (FIG. 12). The first timing circuit 53 generates a pulse S3 (FIG. 12) which rises to H level after a time W1 from the rise of the vertical synchronous signal S2 sensed by the vertical synchronous separation circuit 44. The second timing circuit 54 generates a pulse S4 (FIG. 12) which rises to H level after a time W2 from the rise of the vertical synchronizing signal S2 sensed by the vertical synchronous separation circuit 44. The time W2 is set to a line longer than the time W1. After the first flip-flop 55 receives at its data input a DFF signal S5 (FIG. 12) of L level, when the rise edge of the output pulse of the first timing circuit S3 is detected at its clock input, the first flip-flop 55 outputs a signal S6 (FIG. 12) of H level to the Q output. After the second flip-flop 56 receives at its data input a signal S6 of H level from the Q output of the first flip-flop 55, when the rise edge of the output pulse S4 from the second timing circuit 54 is sensed at the clock input of the second flip-flop 56, the second flip-flop 56 outputs a signal S7 (FIG. 12) of H level to the Q output.

The time W2 set by the second timing circuit 54 is determined so that the fall edge of the Q output of the second flip-flop 56 is fixed before 6.75 H of the rise edge of the vertical sychronizing signal.

After the third flip-flop 57 receives H level at its data input from the Q output S7 of the second flip-flop 56, when it detects the horizontal synchronizing signal at its clock input, the third flip-flop 57 outputs a pulse S8 (FIG. 12) of H level to the Q output thereof. The Q output of the third flip-flop 57 serves as a recording or playback color phase processing control signal.

The operation of the color phase processing control signal generator of FIG. 11 will be further described with reference to FIG. 12. It is now assumed that the fall of the DFF signal is given to the data input of the first flip-flop 55. Even if this state is simply established, the Q output of the first flip-flop 55 is unchanged under the state where it is kept at L level. When a time W1 has passed from the rise edge of a vertical synchronizing signal S2 sensed by the vertical synchronous separation circuit 44, a Q output of the first flip-flop circuit 55 rises by the rise edge of an output pulse S3 from the first timing circuit 53.

When a time W2 has passed from the rise of the vertical synchronizing signal S2 sensed by the vertical synchronous separation circuit 44, the Q output S7 of the second flip-flop 56 rises by the rise edge of the output pulse S4 from the second timing circuit 54. Accordingly, the rise or fall of the Q output S7 of the second flip-flop circuit 56 is fixed before 6.75 H of the rise of the vertical synchronizing signal S2, and therefore does not undergo influence of fluctuations of rotation of the drum 20A, or the like.

The Q output S7 of the second flip-flop circuit 56 is latched in synchronism with the horizontal synchronizing signal by the third flip-flop circuit 57, resulting in a final color phase processing control signal S8. Accordingly, this control signal S8 becomes a signal transiting for H blanking period before color burst signal (i.e., the state changes from H level to L level, or from L level to H level). Thus, there is no possibility that the transition point of the color phase processing control signal reaches the signal portion on the way of the horizontal scanning. As a result, a solely color phase processing is designated per each horizontal scanning, giving rise to no color shift.

It is to be noted that the first timing circuit 53 and the first flip-flop 55 are provided so that the L and H levels of the Q output of the second flip-flop 56 correspond to the L and H levels of the DFF signal, respectively, even if the transition point of the color phase processing control signal determined by the second timing circuit 52 and the state (level) change point of the DFF signal are shifted in terms of time. Namely, if the first timing circuit 53 and the first flip-flop 55 are not provided, where the DFF signal is delayed with respect to the rise of the second timing circuit 54, the color phase control signal becomes a signal which is shifted by an angle of 180 degrees with respect to the phase of the DFF signal, i.e., has inverted L and H levels.

Figure 1E:
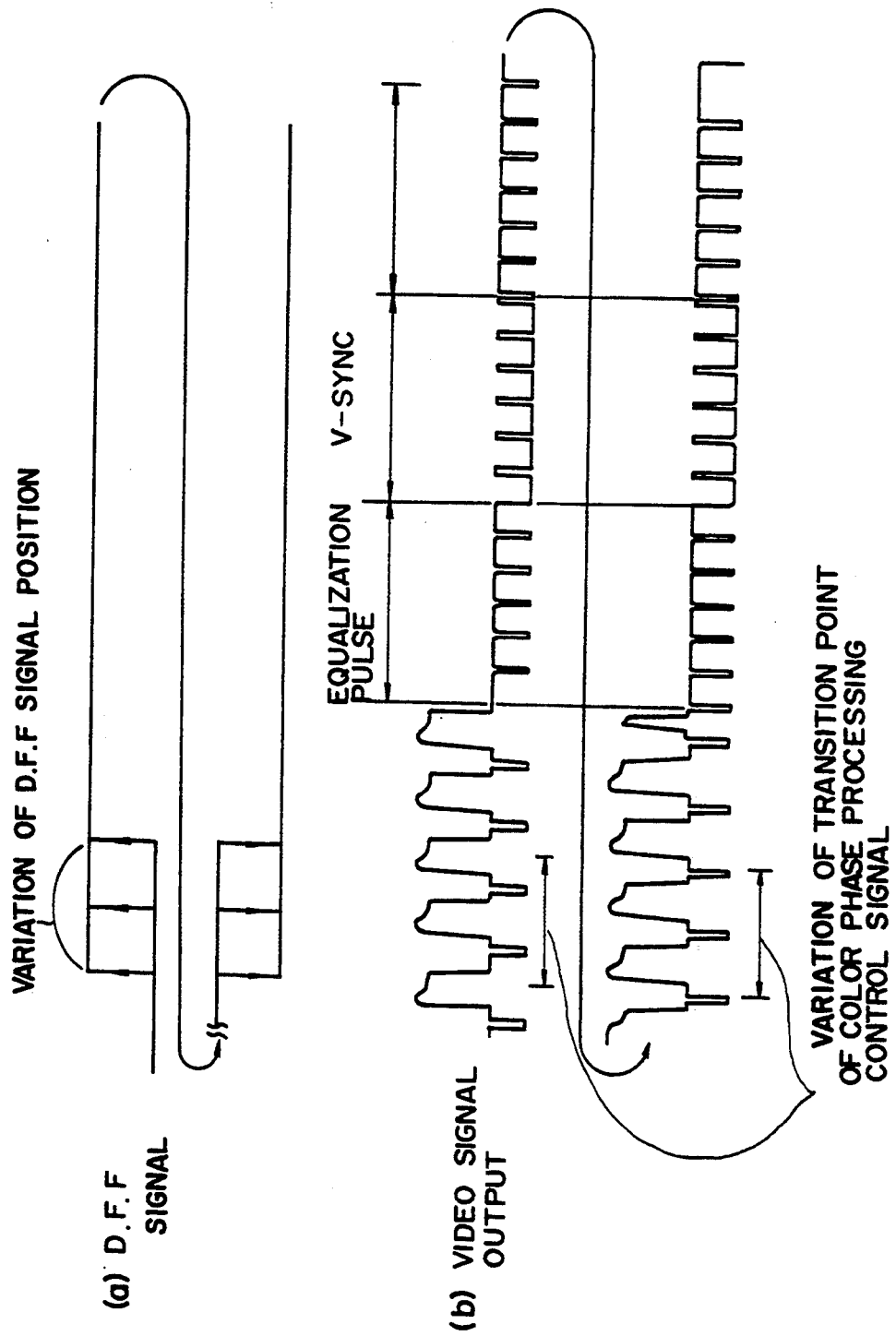
FIG. 1E is a timing chart showing the relationship between the transition point of the color phase processing control signal and the video signal obtained by the equipment of FIG. 1D.
Figure 2B:
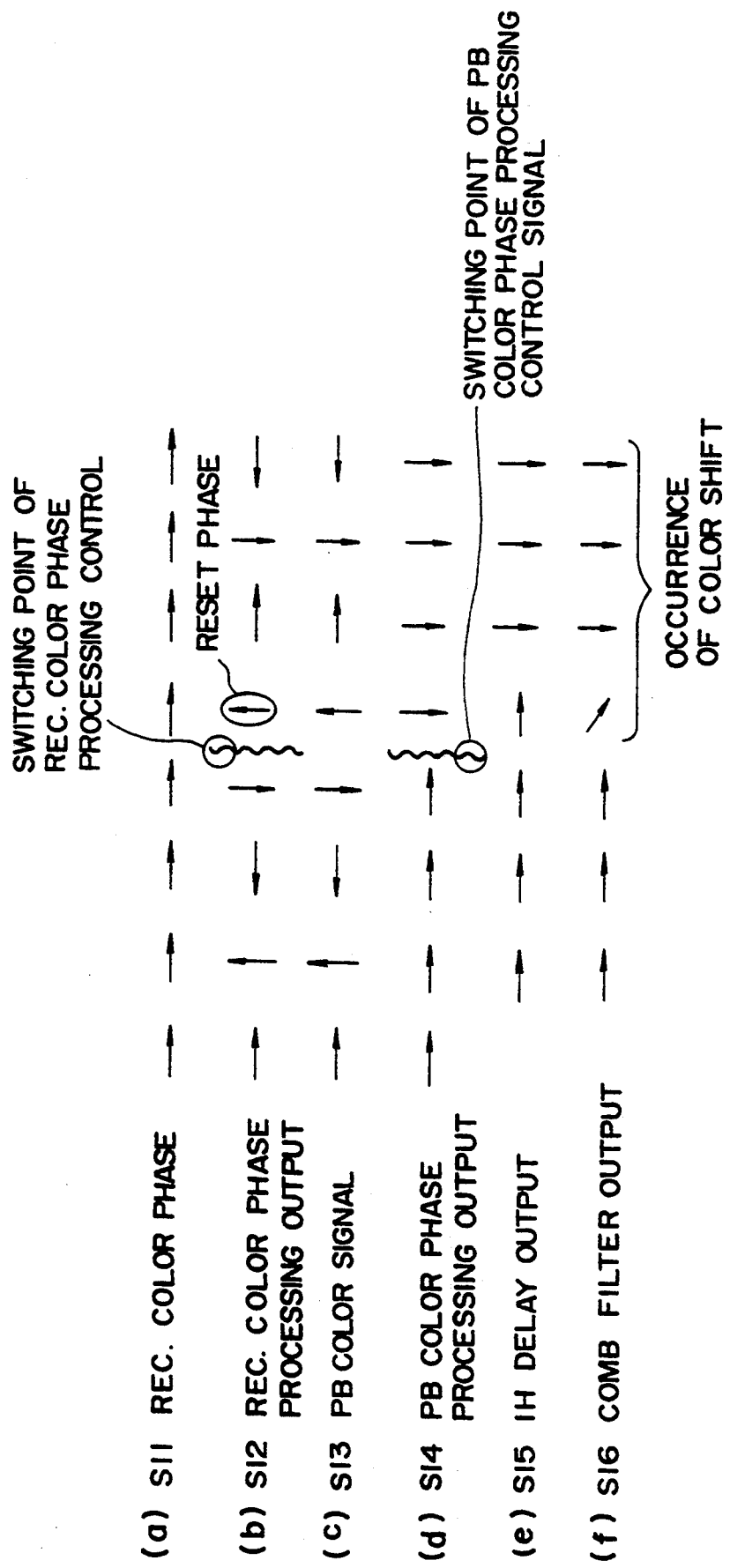
FIG. 2B is a vector diagram of signals on respective components of FIG. 1D.
Figure 13:
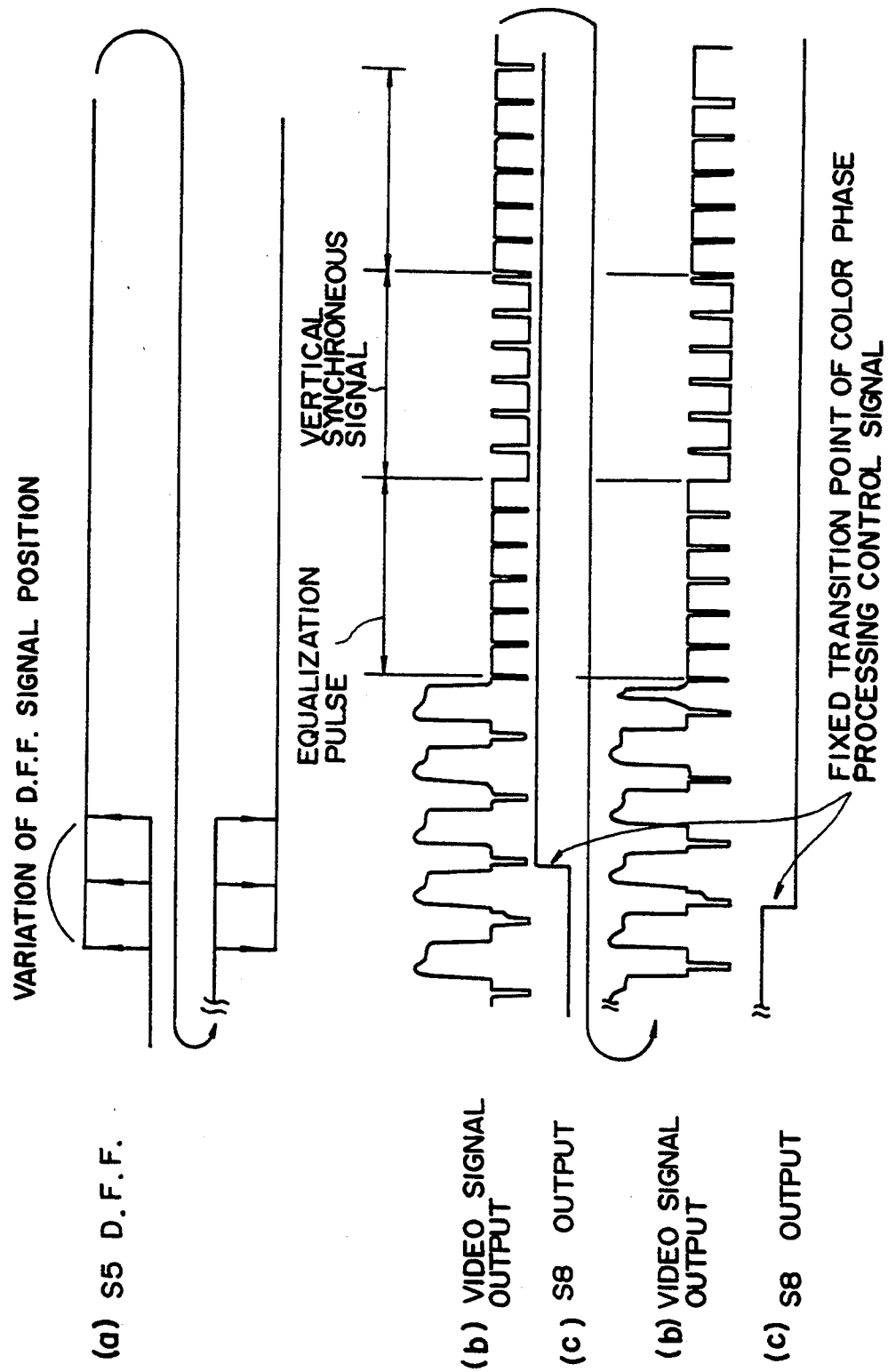
FIG. 13 is a timing chart showing the relationship between the transition point of the color phase processing control signal and the video signal obtained by the circuit shown in FIGS. 11 and 12.

FIG. 13 shows the timing relationship when the video signal and the color phase processing control signal S8 are viewed in terms of H rate. As is clear from the comparison with the prior art in FIG. 1E, the transition point of the color phase processing control signal is a fixed timing with respect to the video signal. Thus, it is seen that the transition point does not undergo influence of fluctuations of rotation of the drum 20A, or the like.

The delay circuit 46 shown in FIG. 10 carries out switching by a signal obtained by the DFF signal by 2 H. Thus, skew of the switching portion which becomes conspicuous in the case where there results the state where there is no color shift or disappearance of color due to a difference between the recording and playback timings an be allowed to be positioned at a lower portion outside screen when viewed on a monitor by 2 H.

Fourth Embodiment

A fourth embodiment of this invention will be described with reference to FIGS. 14 to 19.

Figure 14:
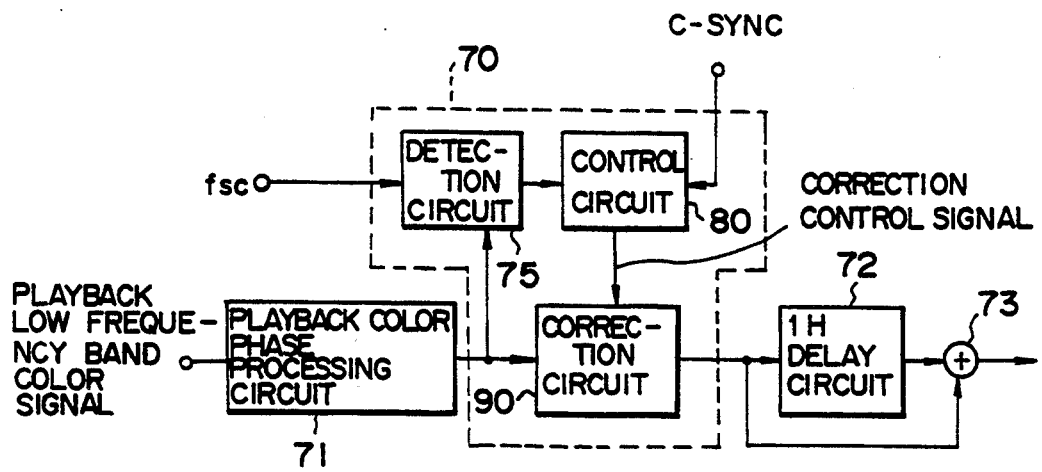
FIG. 14 is a block diagram showing the configuration of a fourth embodiment of a video tape recorder according to this invention.

FIG. 14 shows a basic configuration of a fourth embodiment of a video tape recorder according to this invention. This fourth embodiment is directed to the example where recording and playback are conducted in accordance with the "inversion on the spot" system. A playback color phase processing circuit 71 has the same function as that of the conventional playback color phase processing circuit 204 of FIG. 10. This circuit 71 receives a playback low frequency band color signal and a playback color phase processing control signal indicating the rotation of phase rotation to alter the phase of the low frequency band color signal so that it is in a direction of rotation indicated by the color phase processing control signal on the basis of a predetermined rule in the same manner as in the above-described case. Namely, for example, when the phase of the playback low frequency band color signal rotates by an angle of 90 degrees counterclockwise (or clockwise) every horizontal scanning period (1 H) and the playback color phase processing control signal indicates left rotation (or right rotation), the playback color phase processing circuit 71 changes all the phases of the color signal to original phases which are not subjected to rotation by the recording color signal processing.

The color phase adjustment unit 70 is composed of a sense circuit 75 adapted to receive an output from the playback color phase processing circuit 71 to sense an error in the low frequency band color phase produced at the time of playback by a difference or shift between the switching point of the color phase processing control signal at the time of recording, i.e., the switching point of the color phase alteration rule at the time of recording and the switching point of the color phase processing control signal at the time of playback, i.e., the switching point of the color phase alteration rule at the time of playback, a control circuit 80 adapted to receive a phase error sense signal outputted from the sense circuit 75 to output a correction control signal in accordance with a predetermined logic, and a correction circuit 90 for correcting the phase of a color signal outputted from the playback color phase processing circuit 71 in accordance with a correction control signal outputted from the control circuit 80.

The control circuit 80 and the correction circuit 90 constitute control correction means.

The color phase adjustment unit 70 must be disposed at a position where a playback color signal is changed so that it has a frequency of, e.g., 3.58 MHz and has undergone the color phase processing, and at a position where cancellation of crosstalk by the comb-shaped filter processing is carried out. This is because when the comb-shaped filter processing is conducted, a line on which there is a phase error is added to lines before and after that line, so hue is shifted or the level is reduced. As a result, there results failure to sense an error in the phase. Accordingly, as shown in FIG. 1, the color phase adjustment unit 70 is connected at a stage succeeding to the playback color phase processing circuit 71 and preceding to a playback comb-shaped filter comprised of a 1 H delay circuit 72 and an adder circuit 73. It is to be noted that the functions of the 1 H delay circuit 72 and the adder circuit 73 are the same as those of the 1 H delay circuit 206 and the adder circuit 208 shown in FIG. 1E.

Figure 15:
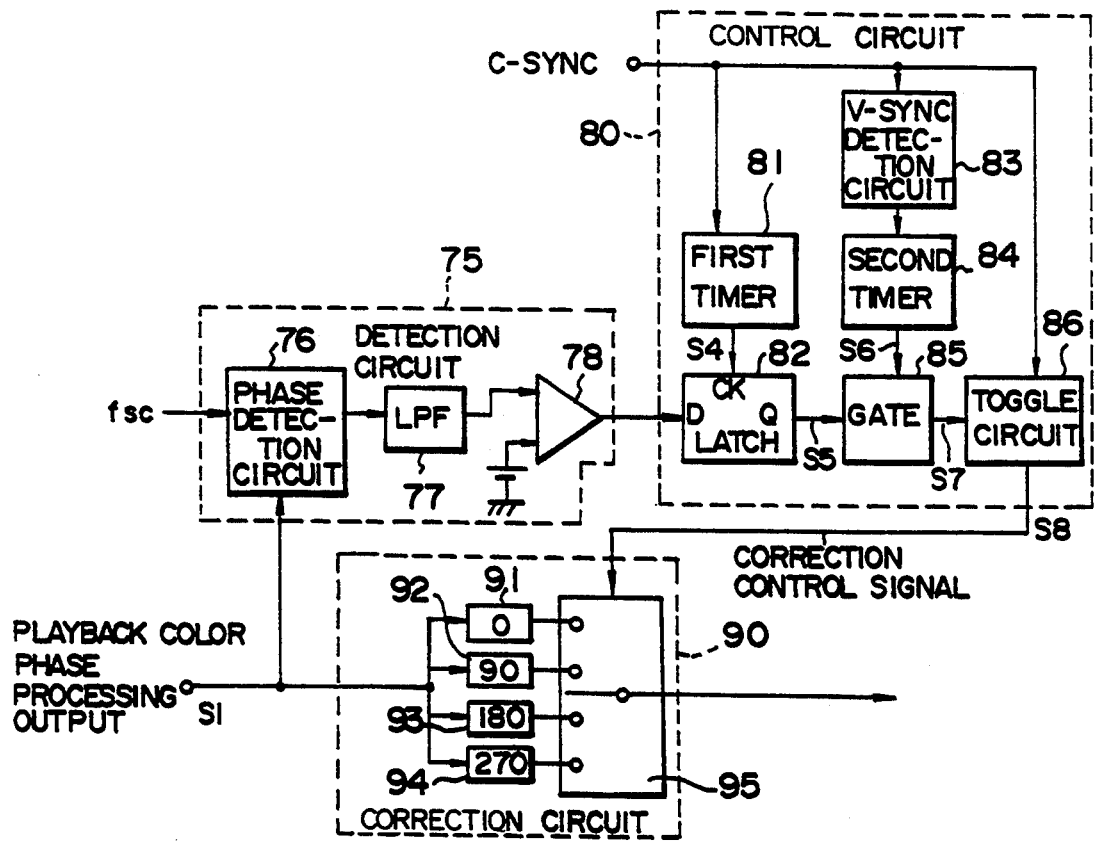
FIG. 15 is a block diagram showing the detailed configuration of the sense circuit 50, the control circuit 60 and the correction circuit 70.
Figure 16:
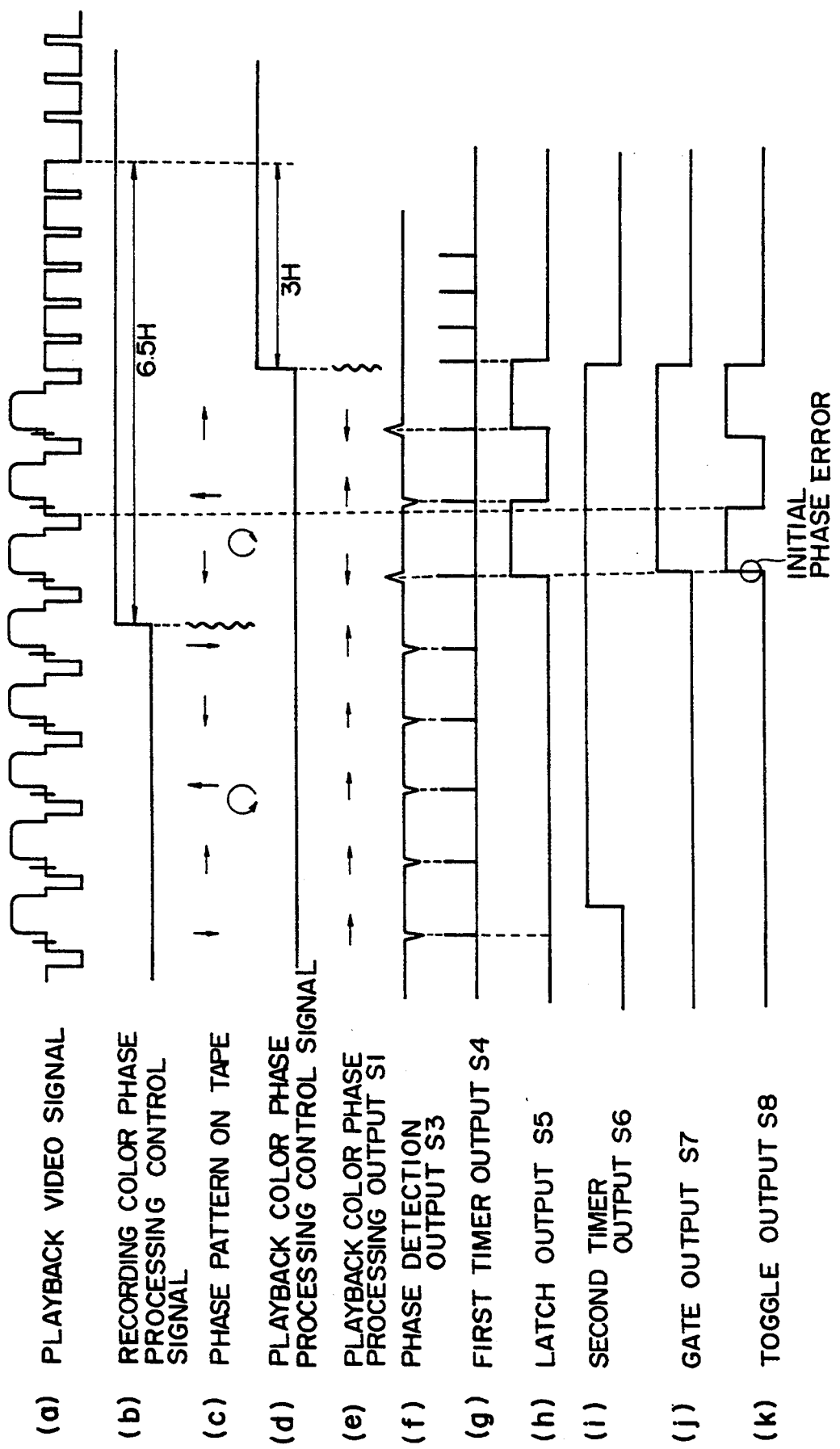
FIG. 16 is a waveform diagram of signals on respective components in FIG. 15.

FIG. 15 shows a detailed configuration of the sense circuit 75, the control circuit 80 and the correction circuit 90 shown in FIG. 14. The sense circuit 75 includes a phase detection circuit 52 for comparing an output signal S1 from the playback color phase processing circuit 71 with a color sub-carrier wave fsc of 3.58 MHz delivered from a basis oscillation circuit (not shown) to implement phase detection to the output signal S1 (FIG. 16). When the phase of the signal S1 is not shifted, an output S3 (FIG. 16) from the phase detection circuit 76 is at L level, while when the phase of the signal is shifted by an angle of 180 degrees, i.e., there is an error in the phase, the output S3 is at H level. An output of the phase detection circuit 76 is connected to the data input of a latch 82 provided in a control circuit 80 through a low pass filter (LPF) 77 and a comparator 78. The low pass filter 77 eliminates unnecessary high frequency band components. The comparator 78 compares a signal from the low pass filter 77 with a predetermined reference voltage to make a waveform shaping.

The control circuit 80 is composed of a first timer 81, a latch 82, a vertical synchronizing signal (V-SYNC) sense circuit 83, a second timer 84, a gate 85, and a toggle circuit 86. The first timer 81 receives a playback composite synchronizing (C-SYNC) signal to deliver a pulse S4 (FIG. 16) at the center of the color burst to the clock input of the latch 82. The latch 82 latches a phase error sense signal (waveform shaping signal of the signal S3) inputted from the sense circuit 75 at a timing of the clock input pulse S4 to generate a latch pulse S5 (FIG. 16) from the Q output.

The V-SYNC sense circuit 83 senses a vertical synchronizing signal from the playback C-SYNC signal. The second timer 84 receives a vertical synchronizing signal sensed by the V-SYNC sense circuit 83 to output a gate pulse 56 (FIG. 16) having a width of, e.g., 10.5 H 3.0 H (H is a horizontal scanning period) at a predetermined timing once every field. The V-SYNC sense circuit 83 and the second timer 84 constitute timing means.

The gate 85 receives a Q output S5 from the latch 82 and a gate pulse S6 outputted from the second timer 84 to generate a gate output S7 (FIG. 16) which represents H level until the backward edge of the gate pulse S6 after the output S5 from the latch 62 shifts to H level within the gate pulse S6. The toggle circuit 86 receives an output S7 from the gate 85 and a horizontal synchronizing signal in the playback C-SYNC signal to generate an output S8 (FIG. 16) which is inverted to H level in response to the edge of H level of the output S7 and is repeatedly inverted every time a horizontal synchronizing signal is inputted at times subsequent thereto.

A H level output signal S8 from the toggle circuit 86 is a correction control signal indicating that the playback color phase processing output S1 should be shifted in phase by an angle of 180 degrees. On the other hand, a L level output signal S8 indicating that it is unnecessary to alter the phase of the playback color phase processing output S1.

The correction circuit 90 comprises a zero degree phase shifter 91 for outputting the phase of the playback color phase processing output S1 as it is without alteration, a 90 degree phase shifter 92 for shifting the phase of the playback color phase processing output S1 by an angle of 90 degrees, a 180 degree phase shifter for shifting the phase of the playback color phase processing output S1 by an angle of 180 degrees, a 270 degree phase shifter 94 for shifting the phase of the playback color phase processing output S1, and a switch 95 for selecting one of four phase shifters 91 to 94 in dependency upon the correction control signal S8 delivered from the control circuit 80.

When the switch 95 receives a correction control signal S8 of H level from the control circuit 80, i.e., the toggle circuit 86, it selects the 180 degree phase shifter 93, while when the switch 95 receives a correction control signal S8 of L level, it selects the zero degree phase shifter 91.

FIG. 16 shows signal waveforms on respective components in the fourth embodiment shown in FIGS. 14 and 15 in the case where a video tape recorded by a recording color phase processing control signal switched at the position before 6.5 H of the vertical synchronizing signal is played back or reproduced by a playback apparatus such that a playback color phase processing control signal is switched at the position before 3.0 H of the vertical synchronizing signal.

When both the recording color processing control signal and the playback color phase processing control signal are not switched, there is no phase error in the playback color phase processing output S1. Thus, the output S3 of the phase detection circuit 76 is maintained at L level.

When a playback color phase processing control signal is not switched while a recording color processing control signal is switched, there occurs a phase error in the playback color phase processing output S1. As a result, the output S3 of the phase detection circuit 76 shifts to H level and the output S8 of the toggle circuit 86 shifts to H level. Thus, the control circuit 80 outputs correction control signal indicating that the phase of the playback color phase processing output S1 should be shifted by an angle of 180 degrees. Responding to this, the switch 90 selects the 180 degree phase-shifter 93.

For the next horizontal scanning period, the output S8 of the toggle circuit 86 shifts to L level to output a correction control signal that the phase of the playback color phase processing output S1 should be as it is. Responding to this, the switch 90 selects the zero degree phase-shifter 91.

In the above-described embodiment, the reason why, in place of an approach to sense phase errors every horizontal scanning period (1 H) to correct them, an approach is employed to sense only an initial phase error to correct remaining phase errors in accordance with a predetermined rule at times subsequent thereto (i.e., correction is made assuming that the same phase errors are present every other horizontal scanning period) is based on the following reasons (1) and (2).

Reason (1)

Figure 17:
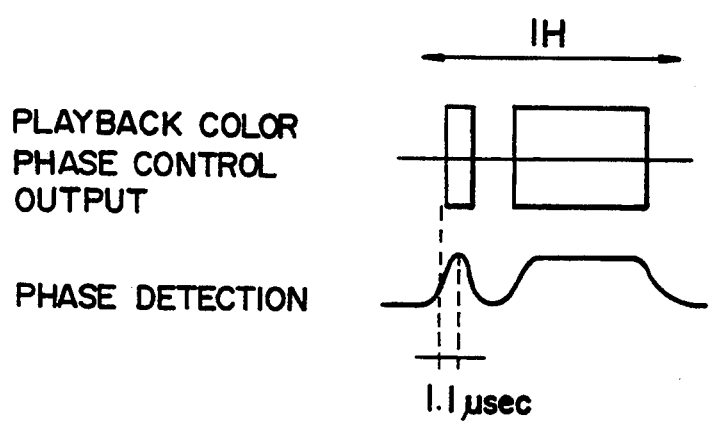
FIG. 17 is an explanatory view of delay of the sense circuit 50 in FIG. 16.
Figure 18:
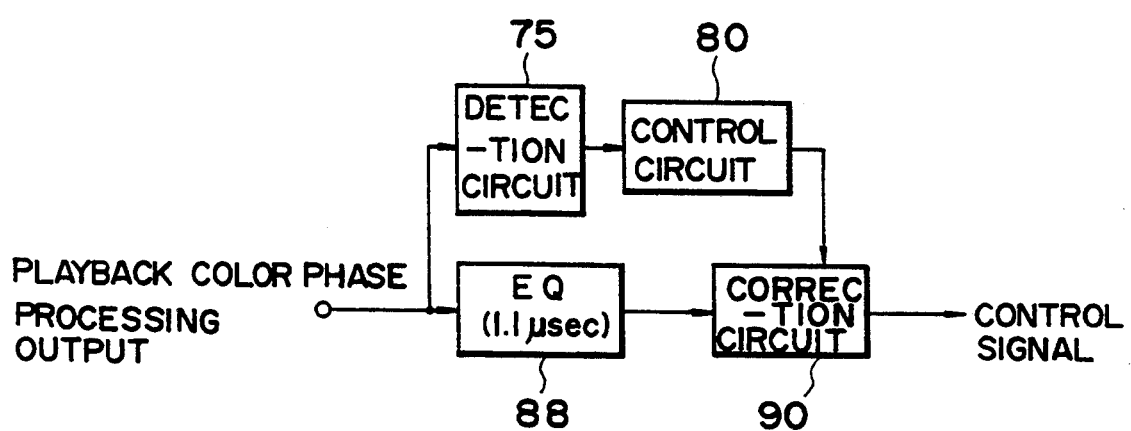
FIG. 18 is a block diagram showing the configuration for coping with delay shown in FIG. 17.

Since sensing of phase is carried out at the burst center, a delay one half of burst (about 1.1 μsec) occurs as shown in FIG. 17. To cope with this, an equalizer (EQ) 88 of about 1 μsec must be inserted at the preceding stage of the correction circuit 90 as shown in FIG. 18. As a result, such an implementation is not practical in view of cost and performance.

Reason (2)

Figure 19:
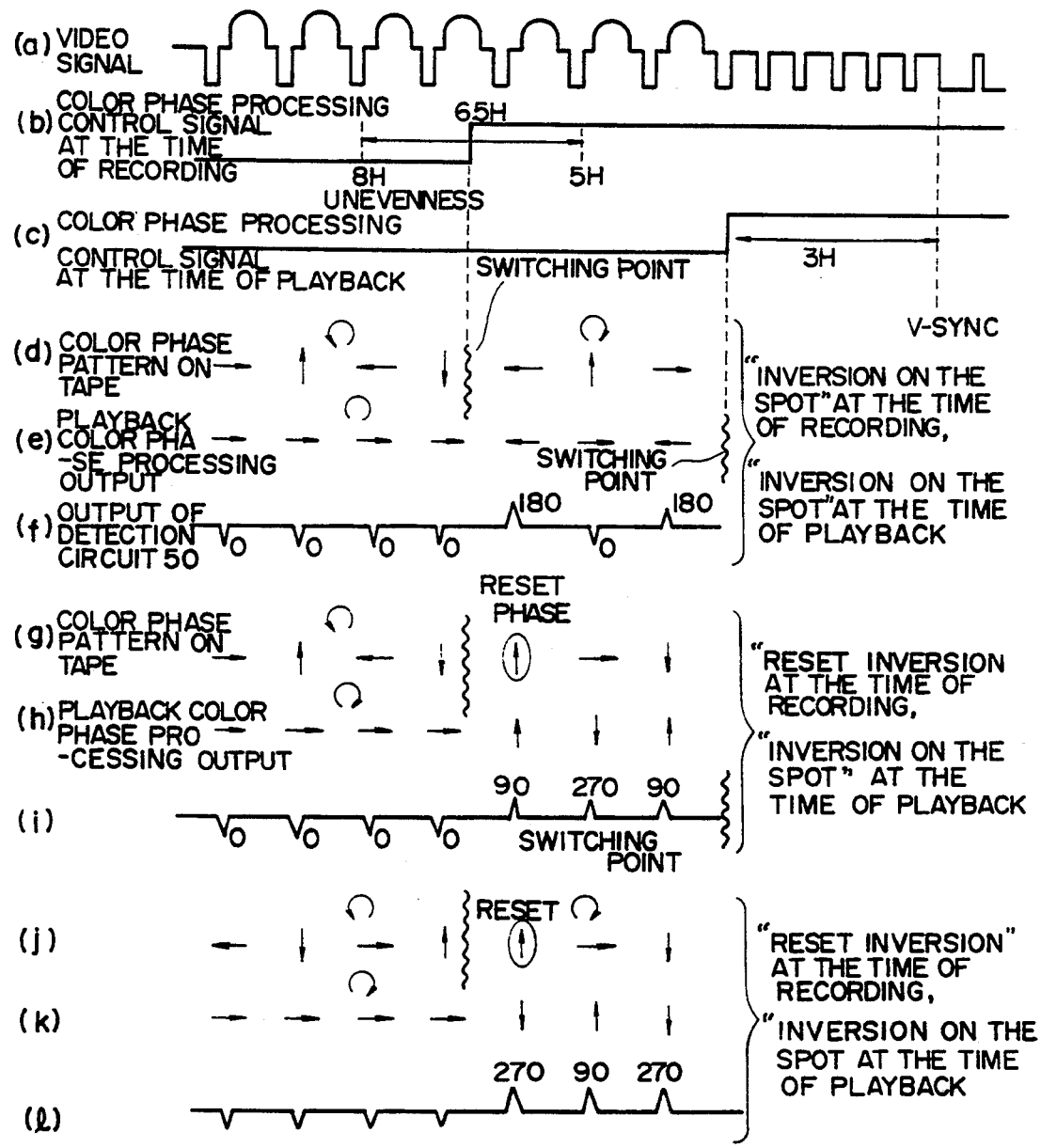
FIG. 19 is a timing chart showing an example of a phase error pattern in the case where various switching systems are employed.

As shown in the upper column of FIGS. 16 and 19, in the case of the "inversion on the spot" system at the time of recording and the "inversion on the spot" at the time of playback, when the switching point of the color phase processing control signal at the time of recording and that at the time of playback differs from each other, the same phase errors appear every other horizontal scanning period, such as, for example in order of "180 degrees, 0 degrees, 180 degrees".

As stated above, it cannot be said that the same phase error appears every other horizontal scanning period only in the case of "inversion on the spot" at the time of recording and "inversion on the spot" at the time of playback.

For example, as shown in the middle portion of FIG. 19, in the case of the "reset inversion" system at the tie of recording and the "inversion on the spot" at the time of playback, the same phase error appears every other horizontal scanning period, such as, for example, in order of "90 degrees, 270 degrees, and 90 degrees". Furthermore, as shown in the lower portion of FIG. 19, the same phase error may occur every other horizontal scanning period, such as, for example, in order of "270 degrees, 90 degrees, and 270 degrees". Namely, where a color phase processing control signal (the direction of rotation) is not switched within a frame at the time of playback, even if any system is adopted for switching, an error inverted every other horizontal scanning period from the initial error would occur.

As is clear from the above-mentioned reason (2), by recognizing the phase and the position of an error initially appearing, if correction is made on the basis of a rule to invert the phase every other horizontal scanning period from that position to the switching point of the playback color phase processing control signal, the problem based on the above-mentioned reason (1) can be solved while there remains the problem of delay in sensing an initial horizontal scanning period. Since the response of an automatic phase control unit (APC) of a color television, etc. is not so fast that it follows the burst error of one horizontal scanning period, even if correction is delayed by a time one half of an initial horizontal scanning period, there is hardly problem in practice.

It is to be noted that the reason why the gate signal S7 is set in the fourth embodiment shown in FIGS. 14 and 15 is that the apparatus of the embodiment is caused to become operative only in the vicinity of the switching points (6, 5±, 5 H) of the color phase control signal, thus to prevent an erroneous operation.

In the above-mentioned fourth embodiment shown in FIGS. 14, 15 and 16, this invention is applied to the case where the "inversion on the spot" system is employed at the time of recording and the "inversion on the spot" system is employed at the time of playback. Accordingly, when the correction control signal S8 is at L level, the switch 95 selects zero degree phase shifter 91, while when the correction control signal S8 is at H level, the switch 95 selects the 180 degree phase shifter 93. On the contrary, in the case of the "reset inversion" system at the time of recording and the "inversion on the spot" system at the time of playback as indicated by the middle portion of FIG. 19, there may be employed an arrangement such that when the correction control signal S8 is at L level, the switch 95 selects the 270 degree phase shifter 94, while when the correction control signal S8 is at H level, the switch 95 selects the 90 degree phase shifter 92. Further, in the case of the "reset inversion" system at the time of recording and the "inversion on the spot" at the time of playback, there may be employed an arrangement such that when the correction control signal is at L level, the switch 95 selects the 90 degree phase shifter 92, while when the correction control signal is at H level, the switch 95 selects the 270 degree phase shifter 94.

It is to be noted that, in a video tape recorder comprising a plurality of video playback heads (not shown), and a head switching circuit (not shown) for switching outputs from these heads to deliver a switched output to the video playback circuit, it is preferable to provide a head switching control circuit for delivering, to the head switching circuit, as a head switching control signal, a drum flip-flop signal adjusted so that the state change point of a drum flip-flop of which state varying in dependency upon changes in the phase of rotation of a drum for playing back a signal from a video tape wound onto the outer circumference thereof is shifted to a position succeeding the period set by the gate output S7 of FIG. 16 (this period is completed at the switching point of the playback color phase processing control signal). This results in no possibility that switching between video heads is not conducted during the phase error correction period. Thus, an erroneous operation can be prevented.

It is to be noted that when such a head switching control head is provided, it is preferable that correction of a phase error is continued up to the time point of occurrence of the head switching control signal.

We claim:

1. A helical scan type magnetic playback apparatus for reproducing an image signal in which a frequency of color signals is changed in a frequency band lower than a luminance signal of which frequency is modulated, the color signal being reproduced from a magnetic recording medium which records the color signals in tracks as a low frequency color signal of which a phase shift is changed at every track, a phase of the color signals being shifted by a predetermined angle at each horizontal period in order not to overlap spectrums of the color signal between two adjacent tracks, the apparatus comprises:

a plurality of magnetic heads;
position signal generator means for generating a position signal indicative of each position of the plurality of magnetic heads;
head switching control signal generation means for generating a head switching control signal responsive to said position signal;
switching means responsive to said head switching control signal from said head switching control signal generation means to switch image signals reproduced by said plurality of magnetic heads;
color signal processing means for separating the low frequency color signal from an output signal output from said switching means, for converting a frequency of the separated low frequency color signal, and for performing a phase shift which is substantially opposite to the phase at recording;
sense means for sensing an error of the phase of said low frequency color signal produced at the time of reproduction by a shift between the switching point of a predetermined rule at the time of recording and the switching of a predetermined rule at the time of reproduction; and
correction means for correcting the phase of said low frequency color signal at the time of reproduction on the basis of a sense signal of a phase error output from the sense means.

2. The helical scan type magnetic playback apparatus as set forth in claim 1, wherein said correction means comprises timing means for setting a fixed period related to the vertical synchronizing signal obtained from a reproduced image signal, and gate means for taking out said phase error sense signal only for a fixed period.

3. The helical scan type magnetic playback apparatus as set forth in claim 2, wherein said head switching control signal generation means generates a modified head switching control signal, by shifting up to a position at or after completion of said fixed period a state change point of said head switching control signal; and
wherein said head switching means switches said image signals reproduced by said plurality of magnetic head responsive to said modified head switching control signal from said switching control signal generation means.

4. The helical scan type magnetic playback apparatus as set forth in claim 3, wherein:

said gate means serves to take out only a first phase error within a fixed period, and said correction means serves to correct a reproduced color phase in accordance with a predetermined rule from the time when said error sense signal is produced to the time when said head switching control signal is produced.

* * * * *